(12) United States Patent
Kuang et al.

(10) Patent No.: US 12,520,203 B2
(45) Date of Patent: Jan. 6, 2026

(54) COMMUNICATION METHOD AND DEVICE

(71) Applicant: Huawei Technologies Co., Ltd., Shenzhen (CN)

(72) Inventors: Yiru Kuang, Beijing (CN); Haibo Xu, Beijing (CN); Lixia Xue, Beijing (CN); Fanhua Kong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 18/460,087

(22) Filed: Sep. 1, 2023

(65) Prior Publication Data

US 2023/0413129 A1 Dec. 21, 2023

Related U.S. Application Data

(63) Continuation of application No. PCT/CN2022/077766, filed on Feb. 24, 2022.

(30) Foreign Application Priority Data

Mar. 4, 2021 (CN) .......................... 202110240470.5
Mar. 31, 2021 (CN) .......................... 202110352120.8

(51) Int. Cl.
*H04W 36/00* (2009.01)
(52) U.S. Cl.
CPC .............................. *H04W 36/0055* (2013.01)
(58) Field of Classification Search
CPC .......... H04W 36/0055; H04W 36/087; H04W 72/51; H04W 88/085; H04W 8/24
USPC ....................................................... 370/331
See application file for complete search history.

(56) References Cited

U.S. PATENT DOCUMENTS

| | | | |
|---|---|---|---|
| 2015/0009917 A1* | 1/2015 | Cho | H04W 74/0875 370/329 |
| 2019/0069333 A1 | 2/2019 | Kim | |
| 2019/0166651 A1* | 5/2019 | Ode | H04W 88/08 |
| 2020/0045586 A1* | 2/2020 | Bogineni | H04W 76/10 |
| 2020/0228964 A1 | 7/2020 | Toeda et al. | |
| 2020/0389901 A1* | 12/2020 | Kimba Dit Adamou | H04W 48/20 |
| 2021/0153037 A1* | 5/2021 | Ke | H04W 8/22 |
| 2022/0030498 A1* | 1/2022 | Futaki | H04W 36/0058 |
| 2022/0167331 A1* | 5/2022 | Huang | H04W 72/20 |
| 2022/0174756 A1* | 6/2022 | Schliwa-Bertling | H04W 24/02 |

(Continued)

FOREIGN PATENT DOCUMENTS

| | | |
|---|---|---|
| CN | 2925294 Y | 7/2007 |
| CN | 201248581 Y | 6/2009 |

(Continued)

OTHER PUBLICATIONS

NEC, "Constraint on usage of RedCap functions," 3GPP TSG-RAN WG2 #111-e R2-206979, Aug. 28, 2020, total 3 pages.
Wilus Inc., "Discussion on higher layer support of Redcap UE," 3GPP TSG RAN WG1 #104-e R1-2101678, Feb. 5, 2021, total 4 pages.
3rd Generation Partnership Project; Technical Specification Group Radio Access Network; NG-RAN; Architecture description (Release 16), 3GPP TS 38.401 V16.4.0, Jan. 2021, total 78 pages.

(Continued)

*Primary Examiner* — Peter G Solinsky

(57) ABSTRACT

This application provides a communication method and a device. The method includes: A first central unit of a network device receives first information from a terminal device, where the first information indicates a type of the terminal device. The first central unit sends second information to a first distributed unit of the network device, where the second information indicates the type of the terminal device.

14 Claims, 9 Drawing Sheets

(56) References Cited

U.S. PATENT DOCUMENTS

| | | | |
|---|---|---|---|
| 2022/0312187 A1* | 9/2022 | Khlass | H04W 48/20 |
| 2024/0031056 A1* | 1/2024 | Rastegardoost | H04W 74/0833 |

FOREIGN PATENT DOCUMENTS

| | | |
|---|---|---|
| CN | 201422690 Y | 3/2010 |
| CN | 107495782 A | 12/2017 |
| CN | 112640532 A | 4/2021 |
| CN | 113630878 A | 11/2021 |
| WO | 2020175490 A1 | 9/2020 |
| WO | 2021033546 A1 | 2/2021 |

OTHER PUBLICATIONS

3GPP TSG RAN WG2 #111-e R2-206979, Constraint on usage of RedCap functions, NEC, Aug. 28, 2020, total 5 pages.

3GPP TS 38.331 V16.3.1 (Jan. 2021), 3rd Generation Partnership Project; Technical Specification Group Radio Access Network; NR-;Radio Resource Control (RRC) protocol specification (Release 16), total 929 pages.

3GPP TSG RAN WG1 #104-e R1-2101678, Discussion on higher layer support of Redcap UE, Wilus Inc., Feb. 5, 2021, total 6 pages.

GPP TS 38.401 V16.4.0, 3rd Generation Partnership Project; Technical Specification Group Radio Access Network; NG-RAN; Architecture description (Release 16), Jan. 2021, total 7 pages.

* cited by examiner

COMMUNICATION METHOD AND DEVICE

CROSS-REFERENCE TO RELATED APPLICATIONS

This application is a continuation of International Application No. PCT/CN2022/077766, filed on Feb. 24, 2022, which claims priority to Chinese Patent Application No. 202110240470.5, filed on Mar. 4, 2021 and Chinese Patent Application No. 202110352120.8, filed on Mar. 31, 2021. All of the aforementioned patent applications are hereby incorporated by reference in their entireties.

TECHNICAL FIELD

Embodiments of this application relate to the field of wireless communication technologies, and in particular, to a communication method and a device.

BACKGROUND

Currently, in LTE Rel-15 and 5G NR evolution, as shown in FIG. 1, a new network architecture is provided. In this network architecture, functions of a base station are divided into two units: a central unit (CU) and a distributed unit (DU). The CU processes a radio higher layer protocol stack function, for example, a radio resource control (RRC) layer and a packet data convergence protocol (PDCP) layer. The DU processes a physical layer of baseband processing and some layer-2 protocol stack functions, for example, a radio link control (RLC) layer, a media access control (MAC) layer, and a physical layer (physical layer, PHY). An interface between the CU and the DU is an F1 interface.

Currently, in a CU-DU network architecture, a network device cannot implement better scheduling and access management for a reduced capability (REDCAP) terminal device.

SUMMARY

Embodiments of this application provide a communication method and a device, so that a network device can perform better scheduling and access management on a reduced capability terminal device.

According to a first aspect, this application provides a communication method, including: A first central unit of a network device receives first information from a terminal device, where the first information indicates a type of the terminal device. The first central unit sends second information to a first distributed unit of the network device, where the second information indicates the type of the terminal device.

For example, a central unit of the network device may be a CU, and a distributed unit of the network device may be a DU. According to the foregoing method, after the terminal device accesses the network device, the first central unit of the network device may send the second information to the first distributed unit of the network device based on the first information received from the terminal device, so that the first distributed unit of the network device can obtain the type of the terminal device in time. For example, the type of the terminal device may be a reduced capability terminal device (for example, a REDCAP terminal device, or an NB-IoT terminal device). Alternatively, the type of the terminal device may be a type of a reduced capability terminal device. For example, when the reduced capability terminal device is the REDCAP terminal device, the type of a reduced capability terminal device may be further subdivided terminal devices with different capabilities in the REDCAP terminal devices, for another example, or may be further subdivided terminal devices of different antennas in the REDCAP terminal devices.

Therefore, in an access process of the terminal device, or when the terminal device is handed over to the first distributed unit of the network device, the first distributed unit of the network device may schedule, based on the type of the terminal device in the second information obtained from the first central unit of the network device, a corresponding resource and an access priority for the terminal device in time, to implement scheduling management on the reduced capability terminal device.

In a possible implementation, the type of the terminal device includes any one of the following: a reduced capability terminal device, or a type of a reduced capability terminal device.

In a possible implementation, the first central unit receives the first information through the first distributed unit.

According to the foregoing method, when the terminal device accesses a network through the first distributed unit and the first central unit, the terminal device may send the first information to the first central unit through the first distributed unit in a transparent transmission manner.

In a possible implementation, the first central unit receives the first information through a second distributed unit, where the second distributed unit is a distributed unit accessed by the terminal device before the terminal device is handed over to the first distributed unit.

According to the foregoing method, when accessing the second distributed unit, the terminal device may send the first information to the first central unit through the second distributed unit, so that the first central unit can obtain the type of the terminal device in time. When the terminal device is handed over to the first distributed unit, the first distributed unit may obtain the second information based on the second information sent by the first central unit, to ensure that the first distributed unit can still schedule a resource of the terminal device in time after the handover.

In a possible implementation, the first central unit receives the first information sent by a second central unit, where the second central unit is a central unit accessed by the terminal device before the terminal device is handed over to the first central unit.

In a possible implementation, the first distributed unit schedules a resource of the terminal device and/or an access priority of the terminal device based on the second information.

In a possible implementation, the first central unit sends the second information to a third distributed unit, where the third distributed unit is a distributed unit to which the terminal device is handed over from the first distributed unit.

According to the foregoing method, the first central unit may send the second information to the third distributed unit when the terminal device is handed over to the third distributed unit, so that the third distributed unit can obtain the type of the terminal device earlier upon the handover, and can provide resource scheduling corresponding to the reduced capability terminal device earlier for the terminal device in a process in which the terminal device accesses the third distributed unit.

In a possible implementation, the first central unit sends the first information to a third central unit, where the third central unit is a central unit to which the terminal device is handed over from the first central unit, the first information is to be used by the third central unit to send the second information to a third distributed unit, and the third distributed unit is a distributed unit to which the terminal device is handed over from the first distributed unit.

According to the foregoing method, the first central unit may send the first information to the third central unit when the terminal device is handed over to the third central unit, so that the third central unit can obtain the type of the terminal device earlier upon the handover, and send the second information to the third distributed unit after the terminal device accesses the third central unit, so that the third distributed unit can provide resource scheduling corresponding to the reduced capability terminal device for the terminal device earlier.

In a possible implementation, the second information is carried in a first message, the first message includes a first field, and the first field carries the second information.

According to the foregoing method, the first field may be newly added to the first message for the second information, so that the second information is sent through the first message. For example, the first message may be a message sent by the first central unit to the first distributed unit, so that the first distributed unit of the network device can obtain the second information earlier, and schedule a resource of the reduced capability terminal device earlier.

According to a second aspect, this application provides a communication method, including: A first distributed unit of a network device receives first information from a terminal device, where the first information indicates a type of the terminal device. The first distributed unit sends second information to a first central unit of the network device, where the second information indicates the type of the terminal device.

For example, a central unit of the network device may be a CU, and a distributed unit of the network device may be a DU. According to the foregoing method, after the terminal device accesses the network device, the first distributed unit of the network device may send the second information to the first central unit of the network device based on the first information received from the terminal device, so that the first central unit of the network device can obtain the type of the terminal device in time. For example, the type of the terminal device may be a reduced capability terminal device (for example, a REDCAP terminal device, or an NB-IoT terminal device). Alternatively, the type of the terminal device may be a type of a medium-reduced capability terminal device. For example, when the reduced capability terminal device is the REDCAP terminal device, the type of a reduced capability terminal device may be further subdivided terminal devices with different capabilities in the REDCAP terminal devices, for another example, or may be further subdivided terminal devices of different antennas in the REDCAP terminal devices.

Therefore, in an access process of the terminal device, or when the terminal device is handed over to the first central unit of the network device or the first distributed unit of the network device, the first central unit of the network device can control access of the reduced capability terminal device in time based on the type of the terminal device in the second information obtained from the first central unit of the network device, to improve utilization of a network resource.

In a possible implementation, the first central unit controls access of the terminal device based on the second information.

In a possible implementation, the first central unit sends the second information to a third distributed unit, where the third distributed unit is a distributed unit to which the terminal device is handed over from the first distributed unit.

In a possible implementation, the first central unit sends the second information to a third central unit, where the third central unit is a central unit to which the terminal device is handed over from the first central unit.

In a possible implementation, the second information is used to control access of the terminal device.

In a possible implementation, the second information is carried in a second message, the second message includes a first field, and the first field carries the second information.

According to the foregoing method, the first field may be newly added to the second message for the second information, so that the second information is sent through the second message. For example, the second message may be an initial uplink radio resource control message transfer message, so that the first central unit of the network device can obtain the second information earlier, and control access of the reduced capability terminal device earlier.

In a possible implementation, the first message is any one of the following: a downlink radio resource control message transfer message, or a terminal device context request message; and the second message is: an initial uplink radio resource control message transfer message.

In a possible implementation, the first information is carried by a message 1 or a message 3.

In the foregoing manner, after the first information, that is, after the message 1 or the message 3 in a random access process, the first distributed unit of the network device or the first central unit of the network device can send the information earlier to a corresponding first central unit or first distributed unit, to scheduling or managing the reduced capability terminal device earlier.

In a possible implementation, the first distributed unit and the first central unit are separated network elements in a first network device, where the first network device is configured for the terminal device to access a network; the second distributed unit and the second central unit are separated network elements in a second network device, where the second network device is configured for the terminal device to access a network; the third distributed unit and the third central unit are separated network elements in a third network device, where the third network device is configured for the terminal device to access a network; the second distributed unit and the first central unit are separated network elements in a fourth network device, where the fourth network device is configured for the terminal device to access a network; or the third distributed unit and the first central unit are separated network elements in a fifth network device, where the fifth network device is configured for the terminal device to access a network.

According to a third aspect, this application provides a communication apparatus used for a first central unit of a network device. The first central unit may include a processing module, a sending module, and a receiving module.

The processing module is configured to receive first information from a terminal device through the receiving module, where the first information indicates a type of the terminal device. The processing module is configured to send second information to a first distributed unit of the network device through the sending module, where the second information indicates the type of the terminal device.

In a possible implementation, the processing module is configured to receive the first information from the terminal device through the first distributed unit through the receiving module.

In a possible implementation, the processing module is configured to receive the first information from the terminal device through a second distributed unit through the receiving module, where the second distributed unit is a distributed unit accessed by the terminal device before the terminal device is handed over to the first distributed unit.

In a possible implementation, the processing module is configured to receive, through the receiving module, the first information sent by a second central unit, where the second central unit is a central unit accessed by the terminal device before the terminal device is handed over to the first central unit.

In a possible implementation, the first distributed unit schedules a resource of the terminal device and/or an access priority of the terminal device based on the second information.

In a possible implementation, the processing module is configured to send the second information to a third distributed unit through the sending module, where the third distributed unit is a distributed unit to which the terminal device is handed over from the first distributed unit.

In a possible implementation, the processing module is configured to send the first information to a third central unit through the sending module, where the third central unit is a central unit to which the terminal device is handed over from the first central unit, the first information is to be used by the third central unit to send the second information to a third distributed unit, and the third distributed unit is a distributed unit to which the terminal device is handed over from the first distributed unit.

In a possible implementation, the second information is carried in a first message, the first message includes a first field, and the first field carries the second information.

According to a fourth aspect, this application provides a communication apparatus used for a first distributed unit of a network device. The first distributed unit may include a processing module, a sending module, and a receiving module.

The processing module is configured to receive first information from a terminal device through the receiving module, where the first information indicates a type of the terminal device. The processing module is configured to send second information to a first central unit of the network device through the sending module, where the second information indicates the type of the terminal device.

In a possible implementation, the type of the terminal device includes any one of the following: a reduced capability terminal device, or a type of a reduced capability terminal device.

In a possible implementation, the first central unit controls access of the terminal device based on the second information.

In a possible implementation, the first central unit sends the second information to a third distributed unit, where the third distributed unit is a distributed unit to which the terminal device is handed over from the first distributed unit.

In a possible implementation, the first central unit sends the second information to a third central unit, where the third central unit is a central unit to which the terminal device is handed over from the first central unit.

In a possible implementation, the second information is used to control access of the terminal device.

In a possible implementation, the second information is carried in a second message, the second message includes a first field, and the first field carries the second information.

With reference to the third aspect or the fourth aspect, the first message is any one of the following: a downlink radio resource control message transfer message, or a terminal device context request message; and the second message is: an initial uplink radio resource control message transfer message.

With reference to the third aspect or the fourth aspect, in a possible implementation, the first information is carried by a message 1 or a message 3.

With reference to the third aspect or the fourth aspect, in a possible implementation, the first distributed unit and the first central unit are separated network elements in a first network device, where the first network device is configured for the terminal device to access a network; the second distributed unit and the second central unit are separated network elements in a second network device, where the second network device is configured for the terminal device to access a network; the third distributed unit and the third central unit are separated network elements in a third network device, where the third network device is configured for the terminal device to access a network; the second distributed unit and the first central unit are separated network elements in a fourth network device, where the fourth network device is configured for the terminal device to access a network; or the third distributed unit and the first central unit are separated network elements in a fifth network device, where the fifth network device is configured for the terminal device to access a network.

According to a fifth aspect, this application provides a communication apparatus, including a processor and a memory. The memory is configured to store computer-executable instructions. When the apparatus runs, the processor executes the computer-executable instructions stored in the memory, the apparatus is enabled to perform any method in the implementation methods of the first aspect.

According to a sixth aspect, this application provides a communication apparatus, including a processor and a memory. The memory is configured to store computer-executable instructions. When the apparatus runs, the processor executes the computer-executable instructions stored in the memory, the apparatus is enabled to perform any method in the implementation methods of the second aspect.

According to a seventh aspect, an embodiment of this application further provides a computer-readable storage medium. The computer-readable storage medium stores instructions. When the instructions are run on a computer, the computer is enabled to perform any method in the implementation methods of the first aspect to the second aspect.

According to an eighth aspect, an embodiment of this application further provides a computer program product. The computer product includes a computer program. When the computer program is run, any method in the implementation methods of the first aspect to the second aspect is performed.

According to a ninth aspect, an embodiment of this application further provides a chip system, including: a processor, configured to perform any method in the implementation methods of the first aspect to the second aspect.

According to a tenth aspect, an embodiment of this application further provides a communication system, including the first central unit in the third aspect or the fifth aspect, or including the first distributed unit in the fourth aspect or the sixth aspect.

DETAILED DESCRIPTION OF ILLUSTRATIVE EMBODIMENTS

The following describes some terms in embodiments of this application, to help a person skilled in the art have a better understanding.

(1) A reduced capability terminal device refers to a terminal device with simplified capabilities designed to improve a battery life of the terminal device in a 5G NR network, including a low data processing capability, a small signal transmit and receive bandwidth, a low battery capacity, and a small quantity of transmit and receive antennas. For example, a REDCAP terminal device supports a lower air interface capability. For example, the REDCAP terminal device supports a smaller bandwidth, a smaller quantity of antennas, a lower modulation order, and the like in terms of capabilities. Specifically, the REDCAP terminal devices may be further classified into different REDCAP terminal device types based on supported maximum capabilities. For example, the REDCAP terminal devices may be classified into a high capability REDCAP terminal device type (for example, a maximum quantity of supported receive antennas is 2, or a maximum supported bandwidth is 40 M) and a low capability REDCAP terminal device type (for example, a maximum quantity of supported receive antennas is 1, or a maximum supported bandwidth is 20 M) It should be noted that, in this embodiment of this application, the reduced capability terminal device may alternatively be a narrow band Internet of Things (NB-IoT) terminal device or a machine type communication (MTC) terminal device, or may alternatively be another type of terminal device with simplified capabilities. That REDCAP is used as a reduced capability terminal device is merely used as an example herein. A name of the reduced terminal device is not limited in this application.

(2) A communication system may be various radio access technology (RAT) systems, for example, a long-term evolution (LTE) system and various LTE evolution-based systems. In addition, the communication system may be further applicable to a future-oriented communication technology, for example, a 5th generation (5G) system or new radio (NR).

Figure 1:
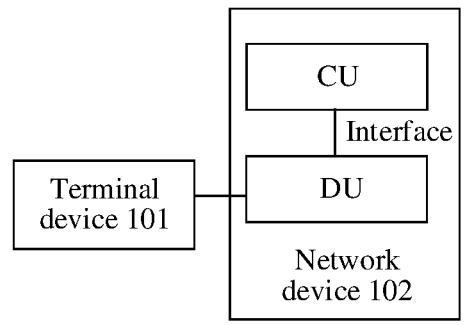
FIG. 1 is a schematic diagram of a network architecture to which an embodiment of this application is applicable.

FIG. 1 is a schematic diagram of a network architecture of a communication system to which an embodiment of this application is applicable.

As shown in FIG. 1, the communication system includes a terminal device 101 and a network device 102. The terminal device 101 accesses the network device 102 through a random access process.

The terminal device 101 may access a wireless network, to obtain a service of an external network (for example, the Internet) through the wireless network, or communicate with another device through the wireless network, for example, communicate with another terminal device. An access network may be a next generation radio access network (NG-RAN), and the access network may include an access network device such as a base station (for example, a gNB). The gNBs are connected to each other through an interface (for example, an Xn interface). A RAN device is configured to access the terminal device 101 to the wireless network, and the gNB is connected to a 5GC through an interface (for example, an Ng interface). A core network may include a plurality of core network devices. The core network device is configured to manage the terminal device and provide a gateway for communication with the external network. When the network architecture shown in FIG. 1 is applicable to the 5G communication system, the core network may be a 5G core network (5GC). The 5GC includes one or more functions or devices. For example, the core network device may be an access and mobility management function (AMF) entity, a session management function (SMF) entity or a user plane function (UPF) entity, a session management function (SMF), and the like. These functions or devices may be network elements in a hardware device, software functions run on dedicated hardware, or virtualized functions instantiated on a platform (such as a cloud platform). It may be understood that, names of various core network devices are names in the 5G communication system. With evolution of the communication system, the names of the various core network devices may be replaced with other names that have the same functions. When the network architecture shown in FIG. 1 is applicable to an LTE communication system, the core network device may be a mobility management entity (MME), a serving gateway (S-GW), and the like.

It should be understood that a quantity of the devices in the communication system shown in FIG. 1 is merely an example. This is not limited in this embodiment of this application. In actual application, the communication system may further include more terminal devices 101 and more RAN devices, and may further include another device.

The RAN may also be referred to as an access network device or a base station, or may be referred to as a RAN node (or a RAN device). Currently, some examples of the access network device are as follows: a gNB/NR-NB, a transmission reception point (TRP), an evolved NodeB (eNB), a next generation eNodeB (ng-eNB), a radio network controller (RNC), a NodeB (NB), a base station controller (BSC), a base transceiver station (BTS), a home base station (such as a home evolved NodeB, or a home NodeB, HNB), a baseband unit (BBU), a wireless fidelity (Wi-Fi) access point (AP), or an access network device in a possible future communication system. Alternatively, the access network device may be a gNB in a 5G system, for example, an NR system, a transmission point (TRP or TP), one or a group (including a plurality of antenna panels) of antenna panels of a base station in the 5G system, or a network node forming a gNB or a transmission point, for example, a baseband unit (BBU).

The terminal device may also be referred to as a terminal, a user equipment (UE), a mobile station (MS), a mobile terminal device MT), or the like, which is a device providing voice or data connectivity for a user, or may be an Internet of Things device. For example, the terminal device may include a handheld device or a vehicle-mounted device having a wireless connection function. Currently, the terminal device may be: a mobile phone, a tablet computer, a notebook computer, a palmtop computer, a mobile Internet device (MID), a wearable device (such as a smartwatch, a smartband, pedometer, and the like), a vehicle-mounted device (such as cars, bicycles, electric cars, airplanes, ships, trains, high-speed rail, and the like), a virtual reality (VR) device, an augmented reality (AR) device, a wireless terminal device in industrial control, a smart home device (such as a refrigerator, a TV, an air conditioner, a meter, and the like), an intelligent robot, a workshop device, a wireless terminal device in self-driving, a wireless terminal device in remote medical surgery, a wireless terminal device in a smart grid, a wireless terminal device in transportation safety, a wireless terminal device in a smart city, a wireless terminal device in smart home, a flight device (such as an intelligent robot, a hot air balloon, a drone, an airplane), and the like. In this embodiment of this application, a UE or a terminal device is used to describe the solution.

Figure 2A:
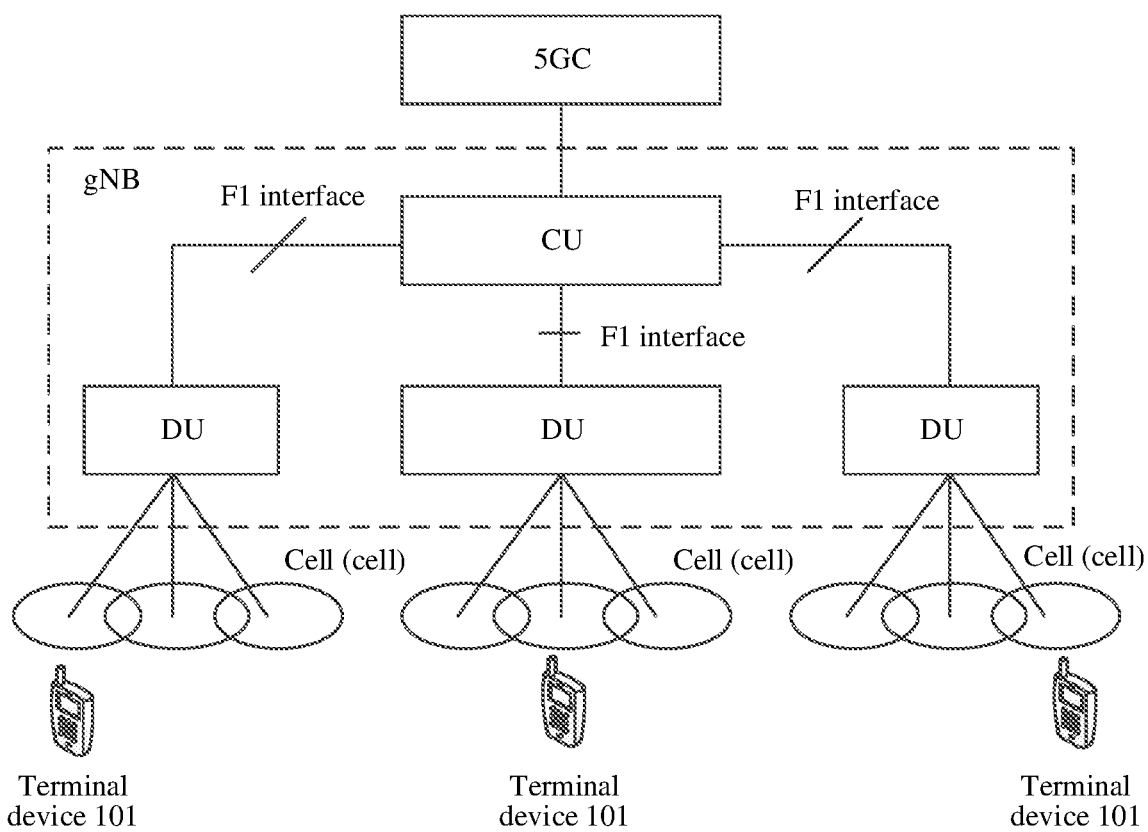
FIG. 2A and FIG. 2B are schematic diagrams of a network architecture to which an embodiment of this application is applicable.

FIG. 2A is a schematic diagram of a network architecture in a 5G communication system to which an embodiment of this application is applicable. As shown in FIG. 2A, the network architecture includes a CN device (for example, a 5GC shown in FIG. 2A), a RAN device, and a terminal device.

The RAN device and the terminal device comply with a specific protocol layer structure to communicate with each other. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. The user plane protocol layer structure may include functions of protocol layers such as the PDCP layer, the RLC layer, the MAC layer, and the physical layer. In a possible implementation, a service data adaptation protocol (SDAP) layer may be further included above the PDCP layer. A main function of the RRC layer is to be a higher-layer control plane of a UE that is related to access control, maintenance, and release of the UE, a configuration of the UE, and the like, so that the RRC layer can parse an RRC message. Main functions of the MAC layer and the physical layer (PHY) are lower-layer scheduling of the UE that is related to data packaging, data scheduling, and the like of the UE, so that the MAC layer can parse control signaling of the MAC layer, and the PHY layer can parse control signaling of the PHY layer. The RAN device may implement the functions of protocol layers such as the RRC, the PDCP, the RLC, and the MAC using one node or implement the functions of such protocol layers using a plurality of nodes.

In a new network architecture of a 5G NR network, a network device may include two logical network elements: a central unit and a distributed unit. Some functions of the network device are deployed in one central unit, and remaining functions are deployed in the distributed unit. A plurality of distributed units may share one central unit, thereby reducing costs and facilitating network expansion. The functions may be integrally deployed or separately deployed based on scenarios and requirements. For example, the central unit may be a CU, and the distributed unit may be a DU. The following describes an example in which a network architecture including a central unit and a distributed unit is a CU-DU separated architecture. With evolution of the network architecture and emergence of new service scenarios, provided that a radio access network device in the communication system has the CU-DU separated architecture or an architecture equivalent to functions of the CU-DU separated architecture, the technical solutions provided in embodiments of this application are also applicable to a similar technical problem.

In this embodiment of this application, the CU and the DU are connected through an interface (for example, an F1 interface). The CU represents that a base station is connected to a core network through an interface (for example, an Ng interface). In the communication system of this application, as shown in FIG. 2A, the UE may be connected to the access network device (for example, a gNB). Specifically, the UE may be connected to the DU in the gNB. The CU is separately connected to the 5GC and the DU. In a downlink communication link, the CU is configured to receive data from the 5GC, and send the data to the DU. In an uplink communication link, the CU is configured to receive data from the DU, and send the data to the 5GC. In addition, the CU has a centralized control function for the DU. In systems using different radio access technologies, devices having a CU function may have different names. For ease of description, the devices having the CU function are collectively referred to as an access network central unit.

The DU is separately connected to the CU and the user equipment (UE). In the downlink communication link, the DU is configured to receive data from the CU, and send the data to the UE. In the uplink communication link, the DU is configured to receive data from the UE, and send the data to the CU. In systems using different radio access technologies, devices having a DU function may have different names. For ease of description, the devices having the DU function are collectively referred to as an access network distributed unit.

In the foregoing network architecture, signaling generated by the CU may be sent to the terminal device through the DU, or signaling generated by the terminal device may be sent to the CU through the DU. The DU may transparently transmit, to the terminal device or the CU, the signaling after being directly encapsulated by the protocol layer without being parsing. If the following embodiments are involved in such signaling transmission between the DU and the terminal device, in this case, transmit and receive of signaling by the DU includes this scenario. For example, signaling of the RRC or PDCP layer is finally processed as signaling of the physical layer and sent to the terminal device, or is converted from received signaling of the physical layer. In this architecture, the signaling of the RRC or PDCP layer may also be considered to be sent by the DU, or sent by the DU and a radio-frequency load.

Figure 2B:
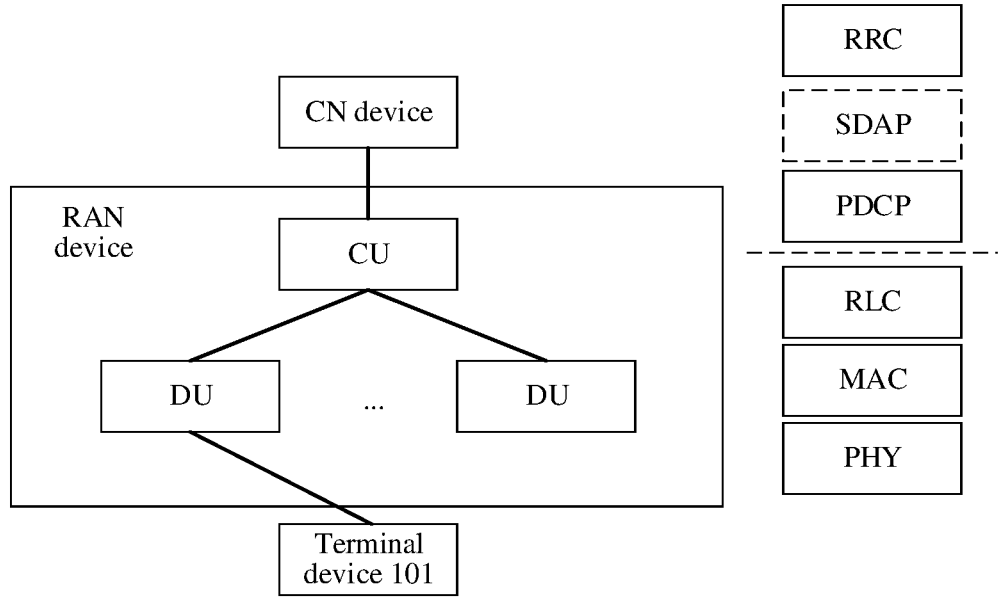

Protocol stack-based allocation between the CU of the network device and the DU of the network device may be shown in FIG. 2B. For example, the RRC layer, the SDAP layer, and the PDCP layer are deployed in the CU of the network device. The RLC layer, the MAC layer, and the physical layer are deployed in the DU of the network device.

In this embodiment of this application, when the network device is a device that supports an NR system, function allocation of the CU and the DU may be performed based on the protocol stacks. The CU of the network device and the DU of the network device are used as two functional entities.

In one possible manner, function allocation is performed based on real-time of content processing. As shown in FIG. 2B, the RRC layer, the SDAP layer, and the PDCP layer are deployed in the CU. The RLC layer, the MAC layer, the PHY layer, and the like are deployed in the DU. Correspondingly, the CU has processing capabilities of the RRC, the PDCP, and the SDAP. For the network device in the CU-DU architecture, the CU of the network device is responsible for managing an RRC state of the terminal device. The DU has processing capabilities of the RLC, the MAC, and the PHY.

It should be noted that, the foregoing function allocation is merely an example, and there may be another allocation manner. For example, the CU includes processing capabilities of the RRC, the PDCP, the RLC, and the SDAP, and the DU has processing capabilities of the MAC and the PHY. For another example, the CU includes processing capabilities of the RRC, the PDCP, the RLC, the SDAP, and a part of the MAC (for example, a MAC packet header is added), and the DU has processing capabilities of the PHY and a part of the MAC (such as scheduling).

The allocation at such protocol layers is merely an example. The allocation may also be performed at other protocol layers. For example, the allocation is performed at the RLC layer, functions of the RLC layer and protocol layers above the RLC layer are allocated to the CU, and functions of protocol layers below the RLC layer are allocated to the DU. Alternatively, the allocation is performed in a protocol layer. For example, some functions of the RLC layer and the functions of the protocol layers above the RLC layer are allocated to the CU, and remaining functions of the RLC layer and the functions of the protocol layers below the RLC layer are allocated to the DU. In addition, the allocation may also be performed in another manner. For example, the allocation is performed based on a delay, a function whose processing time needs to meet a delay constraint is allocated to the DU, and a function whose processing time does not need to meet the delay constraint is allocated to the CU. The allocation at such protocol layers described above is merely an example. The allocation may also be performed at other protocol layers, which are not described in detail herein by using examples.

Certainly, this embodiment of this application may be further applicable to an LTE communication system. For example, the LTE communication system may also include a RAN device and a CN device. The RAN device (eNB) includes a baseband apparatus and a radio-frequency apparatus. The baseband apparatus may be implemented using one node, or may be implemented using a plurality of nodes. The radio-frequency apparatus may be independently implemented remotely from the baseband apparatus, or may be integrated into the baseband apparatus, or a part is remote and a part is integrated in the baseband apparatus. The radio-frequency apparatus may be remotely arranged relative to the baseband apparatus, for example, a remote radio unit (RRU) is remotely arranged relative to a BBU. In addition, the radio-frequency apparatus may be arranged remotely without being arranged in the DU, or may be integrated in the DU, or a part is remote and a part is integrated in the DU. This is not limited herein.

It should be understood that, a quantity and types of the UEs included in the communication system shown in FIG. 2A and FIG. 2B are merely an example. This is not limited in this embodiment of this application. For example, more UEs that communicate with the access network device (such as the gNB) may be included. For brevity, this is not described in detail in the accompanying drawings. In addition, in the communication system shown in FIG. 2A and FIG. 2B, although one base station and one UE connected to each DU are shown, the communication system may not be limited to including the base station and the UE connected to each DU. Details are not described herein again.

In the following embodiment of this specification, that a network supported by a first DU is a union set of networks supported by all logical CUs is used as a main example, that is, the first DU supports a network supported by each logical CU connected to the first DU. For ease of description, a first logical CU is referred to as "first CU" for short in the following descriptions of this specification, and a second logical CU is referred to as "second CU" for short in the following descriptions.

It should be understood that, FIG. 1 to FIG. 2B show only several functions or devices in embodiments of this application, and the communication system architecture may further include more or fewer functions or devices. For example, the 5GC device in FIG. 1 may further include unified data management (UDM), a data network (DN), or the like. The DU shown in FIG. 2A or FIG. 2B may further be configured with more logical cells and the like.

The communication system architecture to which embodiments of this application are applicable is not limited to those shown in FIG. 1 to FIG. 2B. This application is applicable to all communication system architectures that can implement functions of the devices shown in FIG. 1 to FIG. 2B.

The terms "system" and "network" may be used interchangeably in embodiments of this application. "At least one" means one or more, and "a plurality of" means two or more. The term "and/or" is an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one of the following items (pieces)" or similar expressions refer to any combination of these items, including any combination of singular items (pieces) or plural items (pieces). For example, at least one of a, b, or c may represent: a, b, c, a and b, a and c, b and c, or a, b and c.

In addition, unless otherwise specified, ordinal numbers such as "first" and "second" mentioned in embodiments of this application are used to distinguish a plurality of objects, and are not intended to limit an order, a time sequence, priorities, or important degrees of the plurality of objects. For example, a first priority criterion and a second priority criterion are merely used to distinguish different criteria, but do not indicate that content, priorities, or importance degrees of the two criteria are different.

In addition, the terms "include" and "have" in embodiments of this application, the claims, and the accompanying drawings are not exclusive. For example, a process, a method, a system, a product, or a device that includes a series of steps or modules is not limited to the listed steps or modules, and may further include steps or modules that are not listed.

In the network architectures shown in FIG. 1, FIG. 2A, or FIG. 2B, the terminal device 101 performs normal service transmission to set up a connection to the network device 102 and request the network device 102 to allocate a corresponding dedicated resource to the terminal device 101. The terminal device may set up uplink synchronization with the network device through a random access process, and obtain a unique terminal device identifier, for example, a cell radio network temporary identifier (C-RNTI), so that the terminal device may perform uplink transmission with the network device.

The following describes related technical features of the random access process in embodiments of this application.

1. Triggering of the Random Access Process

The random access process refers to a process from a time when the terminal device starts to attempt to access a network by sending a random access signal to a time when a basic signaling connection to the network device is set up. The random access signal may be used to initiate the random access process. For example, the random access signal may be a random access preamble Optionally, the random access signal may alternatively be a demodulation reference signal (DMRS). The terminal device may exchange information with the network device through the random access process, to implement uplink time synchronization with the communication system. Optionally, the terminal device may further perform resource request or data transmission through the random access process. In this embodiment of this application, the random access process may also be referred to as random access, a random access channel process, or a random access manner. This is not distinguished in this application, and may be interchangeably used in the following descriptions.

For example, there may be a plurality of events (or scenarios) that trigger the random access process. For example, in the LTE communication system, the random access process may be triggered in the following scenarios.

Scenario 1: In initial access of the terminal device, the terminal device sets up an initial RRC connection. When an RRC idle (RRC IDLE) state is changed to an RRC connected (RRC_CONNECTED) state, the terminal device initiates random access.

Scenario 2: The terminal device re-establishes an RRC connection (RRC connection re-establishment procedure). When the terminal device needs to re-establish an RRC connection after a radio connection fails, the terminal device initiates random access.

Scenario 3: When the terminal device performs a cell handover (handover), the terminal device initiates random access in a target cell.

Scenario 4: Downlink data arrives. When the terminal device is in a connected state, the network device needs to transmit downlink data to the terminal device, but finds that the terminal device is out of uplink synchronization. That is, in the RRC_CONNECTED state, when the downlink data arrives (in this case, an acknowledgement (ACK)/negative-acknowledgement (NACK) response is required), an uplink is in an "out-of-synchronization" state. The network device controls the terminal device to initiate random access. The network device side maintains an uplink timer. If the uplink timer expires and the network device does not receive a response signal from the terminal device, the network device considers that the terminal device is out of uplink synchronization.

Scenario 5: Uplink data arrives. When the terminal device is in a connected state, the terminal device needs to transmit uplink data to the network device, but finds that the terminal device is out of uplink synchronization. That is, in the RRC_CONNECTED state, when the uplink data arrives (for example, a measurement report needs to be reported or user data needs to be sent), the uplink is in an "out of synchronization" state or no physical uplink control channel (PUCCH) resource is available for scheduling request (SR) transmission (in this case, a terminal device in uplink synchronization is allowed to use a random access channel (RACH) to replace the SR). In this case, the terminal device initiates random access. The terminal device side maintains an uplink timer. If the uplink timer expires and the terminal device does not receive a command for adjusting a maximum time advance (TA) value by the network device, the terminal device considers that the uplink is out of synchronization.

For another example, in the 5G communication system, the random access process may be further triggered in the following scenarios.

(1) The uplink (UL) data arrives in an inactive (Inactive) state, and in this case, the uplink is in the "out-of-synchronization" state. (2) The downlink (DL) data arrives in the inactive state, and in this case, the uplink is in the "out-of-synchronization" state. (3) On-demand system information (SI) is requested (in the 5G communication system, the system information is classified into two types: minimum SI and On-demand SI, where the minimum SI needs to be accepted by all terminal devices, and the On-demand SI may be requested according to demands of a terminal device). (4) Beam failure recovery (BFR).

The foregoing are events that trigger the random access process. It can be learned that, regardless of an LTE system or an NR system, the terminal device needs to access the network device through the random access process. There are two different manners for the random access process: contention based (contention based) random access and non-contention based (non-contention based) random access. For example, depending on whether a preamble sent by the terminal device is selected by the terminal device, the random access process may be classified into a contention based random access process and a non-contention based random access process. In the contention based random access process, the preamble may be selected by the terminal device. When an event that triggers the random access process is another event other than the handover and the beam failure recovery described above, the contention based random access process may be used. In a non-contention based random access process, the preamble may be allocated by the network device to the terminal device. When an event that triggers the random access process is an event of the handover or the beam failure recovery described above, the non-contention based random access process may be used.

Figure 3:
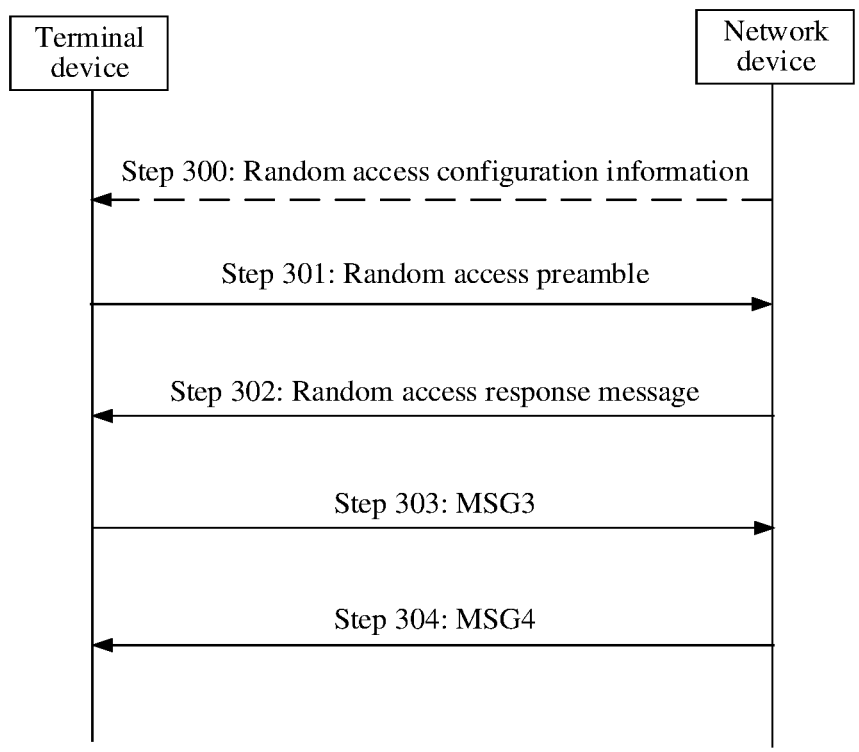
FIG. 3 is a schematic flowchart of a random access method.

The following uses the contention based random access process as an example to describe some steps included in the random access process with reference to FIG. 3. FIG. 3 is a schematic diagram of a random access process according to an embodiment of this application. As shown in FIG. 3, the random access process provided in this embodiment of this application includes the following steps.

Step 300: When the network device sends random access configuration information to the terminal device, the terminal device may receive the random access configuration information from the network device, where the random access configuration information is used to configure a random access parameter. This step may be preparation work before the random access process is performed, and is not a step included in the random access process.

For example, the random access parameter may include one or more of the following: a physical random access channel (PRACH) resource set used to transmit a random access preamble; a random access preamble set; a maximum quantity of transmission times of the random access preamble; an initial transmit power of the random access preamble; a size of a random access response window; a maximum quantity of hybrid automatic repeat request (HARQ) repeat times of a third message; and duration of a contention resolution timer. Further, the random access parameter may further include a power ramping step.

The PRACH resource set may include a time-frequency resource that can be used by the terminal device to send the preamble, and may be indicated by a field rach-ConfigGeneric. The maximum quantity of transmission times of the random access preamble may be indicated by a field totalNumberOfRA-Preambles. The initial transmit power of the random access preamble may be indicated by a field reambleInitialReceivedTargetpower. The size of the random access response window indicates a quantity of subframes included in the random access response window, and may be indicated by a field ra-ResponsewindowSize. The random access response window starts from a third subframe after a subframe in which the terminal device sends a preamble (if the preamble spans a plurality of subframes in time domain, a last subframe is used as a start for counting), and sustains for ra-ResponseWindowSize subframes. The maximum quantity of HARQ repeat times of the third message may be indicated by a field maxHARQ-Msg3. The duration of the contention resolution timer may be indicated by a field mac-ContentionResolutionTimer.

It should be noted that: (1) A corresponding default value may be set for each of "the PRACH resource set, the preamble set, the maximum quantity of transmission times of the random access preamble, the initial transmit power of the random access preamble, the size of the random access response window, the maximum quantity of HARQ repeat times of the third message, and the duration of the contention resolution timer" described above. For example, when the random access configuration information sent by the network device is configured with a PRACH resource set but not configured with the maximum quantity of transmission times of the random access preamble (for example, the random access configuration information includes the field rach-ConfigGeneric, but does not include the field totalNumberOfRA-Preambles), a value of the maximum quantity of transmission times of the random access preamble may be a default value.

(2) The foregoing describes an example of content included in the random access parameter. In another possible embodiment, the random access parameter may further include other content related to the random access process, for example, time indication information.

Step 301: The terminal device sends the preamble to the network device, and the network device receives the preamble from the terminal device, where the preamble is also referred to as a first message or a message 1 (MSG1) in the random access process.

The preamble sent by the terminal device to the network device in step 301 may be a random access request sent by the terminal device to the network device. The preamble may be a preamble selected by the terminal device from the preamble set that is obtained in step 300 for random access. Optionally, the network device may estimate a transmission delay between the network device and the terminal device based on the preamble, and calibrate uplink timing based on the transmission delay.

Step 302: After detecting the preamble sent by the terminal device, the network device sends a random access response (RAR) message to the terminal device.

Correspondingly, the terminal device receives the RAR message from the network device. The RAR message is also referred to as a second message or a message 2 (MSG2) in the random access process. The message 2 includes a MAC protocol data unit (PDU) including a media access control MAC subheader and a MAC RAR. The message 2 may include one or more types of the following information: an identifier or index of the detected preamble, uplink time synchronization information, and an uplink resource and a BI that are allocated to the terminal device for sending the message 3. Certainly, the message 2 may further include other information. The identifier of the preamble is, for example, a random access preamble identifier (RAPID). It should be noted that, if the network device does not receive the preamble sent by the terminal device, the message 2 sent by the network device does not include the identifier of the preamble corresponding to the terminal device.

For example, the MAC RAR may include a command for timing advance (TA), where the TA is used to specify a time adjustment value required for uplink synchronization of the terminal device; or may further include the uplink resource allocated to the message 3; or may further include a temporary cell radio network temporary identifier (TC-RNTI) allocated to the terminal device, where the TC-RNTI is used for subsequent transmission of the terminal device and the network device, and after a conflict is resolved, the TC-RNTI may become a cell radio network temporary identifier (C-RNTI).

After sending the message 1, the terminal device receives the message 2 in a RAR time window (RA response window). If no message 2 returned by the network device is received in the RAR time window, it is considered that the random access process fails. For a terminal device that fails in random access, the network device may send a backoff indication to the terminal device. The backoff indication may indicate a time value, and the time value is used to determine a backoff time range. When the random access process fails, the terminal device may select a backoff time within the backoff time range, and the random access resource configured for the terminal device by the network device in step 300 cannot be used again until the selected backoff time ends.

Step 303: The terminal device sends uplink data to the network device based on the message 2.

Correspondingly, the network device receives the uplink data from the terminal device. The uplink data is also referred to as a third message or a message 3 (MSG3) in the random access process.

The message 3 may include identifiers of different scenario information, and the identifiers are used for contention resolution in step 304. The message 3 may have different content based on different states of the terminal device and different application scenarios. An identifier (for example, a UE-ID) of the terminal device is used as an example. For example, in an initial access scenario, the message 3 is an RRC setup request (RRCSetupRequest) message. In this case, the message 3 carries a unique identifier of the terminal device or a random number. In a scenario in which the terminal device reestablishes an RRC connection, the message 3 is an RRC reestablishment request (RRCReestablishmentRequest) message, and an identifier of corresponding scenario information is a C-RNTI. For an RRC connection resumption scenario, the message 3 is an RRC resume request (RRCResumeRequest) message, and an identifier of corresponding scenario information may be a C-RNTI. For another scenario in which the terminal device is in an RRC connected state, the unique identifier of the terminal device carried in the message 3 may be a C-RNTI. For example, the message 2 may carry the uplink resource and the TA command. In this way, after receiving the message 2, the terminal device sends, using a TA value indicated by the TA command, the message 3 on the uplink resource indicated by the message 2.

Step 304: When detecting the message 3, the network device sends a contention resolution message to the terminal device, and the terminal device receives the contention resolution message from the network device.

The contention resolution message is also referred to as a fourth message or a message 4 (MSG4). The message 4 may include a part of content of the message 3 or a physical downlink control channel (PDCCH) including a C-RNTI, that is, the message 4 includes the C-RNTI carried by the PDCCH.

The message 4 is used for contention resolution. In a contention resolution mechanism, the network device includes a unique identifier in the message 4 (the message 3 includes the unique identifier of the terminal device), to specify a terminal device that successfully accesses the network, and another terminal device that fails in contention resolution initiates random access again.

For example, if the network device receives the uplink data sent by the terminal device, the message 4 may carry the identifier of the terminal device. If the network device does not receive the uplink data sent by the terminal device, the message 4 sent by the network device does not include the identifier of the terminal device. When receiving the message 4, the terminal device may determine, depending on whether the identifier of a terminal device carried in the message 4 is consistent with the identifier of the terminal device itself, whether the terminal device successfully accesses the network device. If the two identifiers are consistent, it is determined that the terminal device successfully accesses the network device; or if the two identifiers are inconsistent, it is determined that the terminal device fails to access the network device.

Optionally, after the message 4, a message 5 sent by the terminal device to the network device may be further included. The message 5 may be used to send capability information of the terminal device. For a specific manner, refer to the following FIG. 7. Details are not described herein again.

It should be noted that, the foregoing describes an implementation process of the contention based random access process, and provides a reference for implementation of the non-contention based random access process. Different from the contention based random access process, for the non-contention based random access process, the random access parameter may further include a powerRampingStepHighPriority and a scalingFactorBI in addition to the parameters described above.

The 5G communication system is used as an example. The terminal device may be some special terminal devices such as a REDCAP terminal device, an NB-IoT terminal device, or an MTC terminal device. Resources and access manners need to be correspondingly allocated to these reduced capability terminal devices, to meet requirements of a narrow bandwidth and low power consumption of the reduced capability terminal devices. Based on this, when such a device accesses a network device, the network device needs to know as early as possible whether the accessed terminal device is a reduced capability terminal device, so that the access network device can schedule a corresponding resource for the reduced capability terminal device earlier, or perform access control on the reduced capability terminal device.

Figure 4:
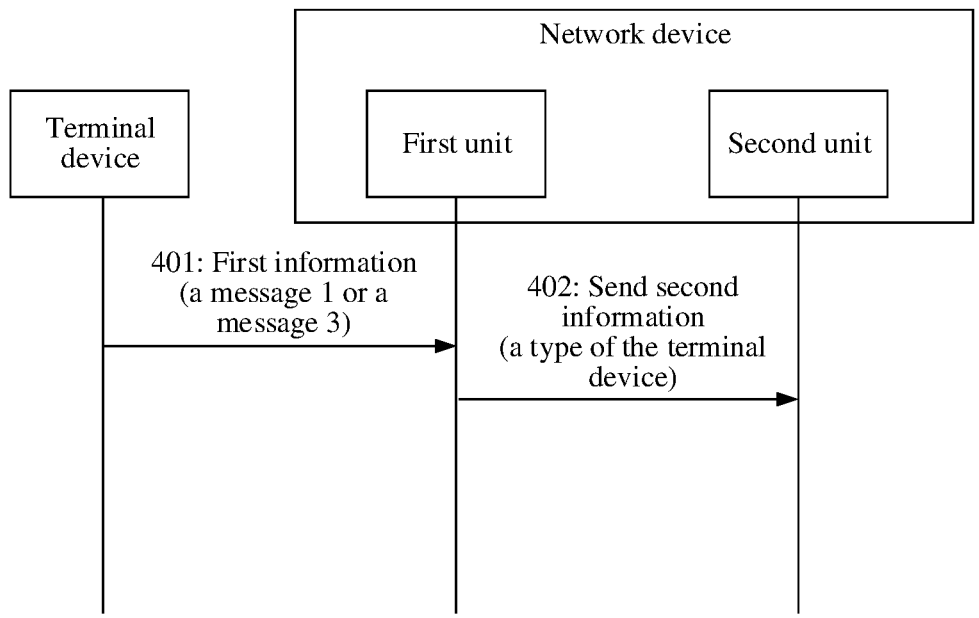
FIG. 4 is a schematic flowchart of a communication method according to an embodiment of this application.

Based on the foregoing architecture, an embodiment of this application provides a communication method, to implement an access procedure of a terminal device after the foregoing architecture provided in embodiments of this application is applied. As shown in FIG. 4, the method may include the following steps.

Step 401: A first unit of a network device obtains first information from the terminal device.

In some embodiments, the first unit may be a DU of the network device, and a second unit is a CU of the network device. In this case, the network device may obtain the first information based on the first information sent by the terminal device. Alternatively, the first unit is a CU of the network device, and the second unit is a DU of the network device. In this case, the network device may receive the first information from the terminal device through the DU of the network device. In some other embodiments, the first unit may be a target DU of the network device, and the second unit may be a target CU of the network device. That is, the terminal is handed over from a source CU to the target CU, and handed over from a source DU to the target DU based on reasons such as movement. In this case, the first unit may be the target DU of the network device. Therefore, the CU of the network device may send the first information from the terminal device to the target DU of the network device in a handover process, so that the target DU of the network device obtains the first information from the terminal device. Alternatively, the CU is unchanged, and the terminal device is handed over from the source DU to the target DU. In this case, the first unit may be the target DU of the network device, and the second unit may be the target CU of the network device. Therefore, in a handover process, the network device may first send the first information from the terminal device to the target CU of the network device through the source CU of the network device, and then send the first information from the terminal device to the target DU of the network device through the target CU of the network device, so that the target DU of the network device obtains the first information from the terminal device.

The first information indicates a type of the terminal device, and the type of the terminal device includes: The terminal device is a reduced capability terminal device, or the type of the terminal device is a type of a reduced capability terminal device.

For a specific indication manner, refer to the following manner 1 to manner 3. Details are not described herein again.

Step 402: The first unit of the network device sends second information to the second unit of the network device.

The second information indicates the type of the terminal device, and the type of the terminal device includes: The terminal device is a reduced capability terminal device, or the type of the terminal device is a type of a reduced capability terminal device.

In some embodiments, the second information indicates that the terminal device is a reduced capability terminal device. For example, the second information may identify the type of the terminal device based on an identifier of the terminal device. For example, the second information is the identifier of the terminal device, and identifier=0 indicates that no type is configured for the terminal device. Identifier=1 indicates that the terminal device is a REDCAP terminal device. Identifier=2 indicates that the terminal device is an NB-IoT terminal device. Identifier=3 to 10 are reserved for future use. Identifier=11 indicates that the terminal device is a terminal device corresponding to an access class 11, and so on.

For another example, the second information may further indicate that the terminal device is a reduced capability terminal device whose maximum quantity of supported receive antennas is 2, or indicate that the terminal device is a reduced capability terminal device whose maximum quantity of supported receive antennas is 1, or indicate that the terminal device is a reduced capability terminal device whose maximum supported bandwidth is 40 M, or indicate that the terminal device is a reduced capability terminal device whose maximum supported bandwidth is 20 M, or the like. Specifically, the second information may further be classified based on the identifier of the terminal device. For details, refer to the foregoing example.

In some other embodiments, the second information may indicate a type of a reduced capability terminal device. Compared with a manner in which the second information indicates a reduced capability terminal device, when the second information indicates a type of a reduced capability terminal device, more bits may be set correspondingly. For example, the type of a reduced capability terminal device may be a type such as a reduced capability terminal device with two receive antennas or a reduced capability terminal device with one receive antenna. In this case, the type of a reduced capability terminal device may be indicated by 2 bits of the second information. For example, 00 in the second information indicates a high capability terminal device, 11 in the second information indicates a reduced capability terminal device with two receive antennas, and 01 in the second information indicates a reduced capability terminal device with one receive antenna.

According to the foregoing method, after obtaining the first information from the terminal device, the CU of the network device or the DU of the network device can share information about whether the terminal device is a reduced capability terminal device, so that the CU of the network device can perform access control on an accessed reduced capability terminal device in time, and the DU of the network device can properly schedule a resource of the accessed reduced capability terminal device in time or properly allocate an access priority of the reduced capability terminal device, to implement earlier and more timely management for the reduced capability terminal device, and optimize network performance of the reduced capability terminal device.

The following uses specific examples to describe the solutions in this embodiment of this application.

Example 1

Figure 5:
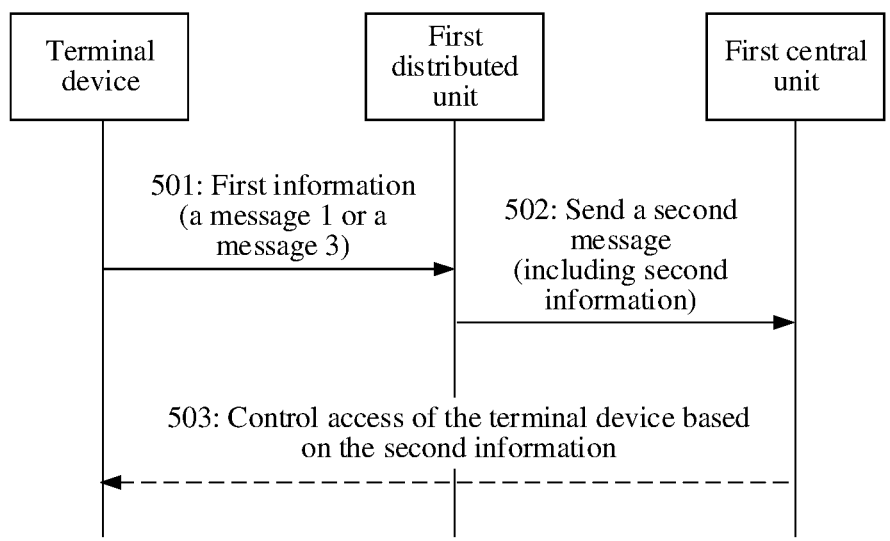
FIG. 5 is a schematic flowchart of a communication method according to an embodiment of this application.

Based on the foregoing architecture, an embodiment of this application provides a communication method, to implement an access procedure of a terminal device after the foregoing architecture provided in embodiments of this application is applied. As shown in FIG. 5, the method may include the following steps.

Step 501: The terminal device sends first information to a first DU.

The first information indicates a type of the terminal device, and the type of the terminal device includes: The terminal device is a reduced capability terminal device, or the type of the terminal device is a type of a reduced capability terminal device.

In some embodiments, when accessing a network device, the terminal device may send the first information to a DU of the network device through a message 1 or a message 3 in a random access process. Correspondingly, the DU of the network device receives, through the message 1 or the message 3 in the random access process, the first information sent by the terminal device, so that the type of the UE can be identified.

A manner 1 and a manner 2 in which the DU of the network device receives, through the message 1 or the message 3 in the random access process, the first information sent by the UE are described below by using examples.

Manner 1: The first information is determined based on resource information carried in the message 1.

Alternatively, the first information is determined based on resource information corresponding to the message 1.

For example, considering that a specific PRACH time-frequency resource or a specific preamble codeword sequence is configured for the reduced capability terminal device, after the terminal device selects a specific time-frequency resource or a specific codeword sequence, the terminal device may send a corresponding time-frequency resource or codeword sequence through the message 1, so that the DU of the network device may use the time-frequency resource or codeword sequence sent through the message 1 as the first information, and the DU of the network device determines that the terminal device is a reduced capability terminal device based on the time-frequency resource or codeword sequence of the terminal device.

For another example, considering that a specific initial bandwidth part (BWP) is configured for the reduced capability terminal device, after the terminal device selects a specific initial BWP, the terminal device sends the message 1 through a time-frequency resource or a codeword sequence corresponding to the specific initial BWP, so that the DU of the network device may use the initial BWP corresponding to the message 1 as the first information, to determine that the UE is a reduced capability terminal device.

In the manner 1, the first information is determined based on information about a PHY layer. Therefore, a DU having a PHY layer may obtain the first information, to determine that the terminal device is a reduced capability terminal device.

According to the manner 1, a base station can more properly schedule a subsequent message 2, message 3, message 4, and latter messages. In addition, according to the manner 1, the base station can perform priority processing for access of a non-reduced capability terminal device and a REDCAP UE, for example, the non-reduced capability terminal device is preferentially accessed. Alternatively, when the base station is a base station that preferentially configures a corresponding resource for a reduced capability UE, the REDCAP UE is preferentially allowed to access the network. Therefore, it may be further set that a random access process initiated by the reduced capability terminal device and a random access process triggered by a handover event (or a BFR event) may have a same priority, or may have different priorities.

Manner 2: The first information is carried using a second field in the message 1 or the message 3 in the random access process.

The second field may be introduced into the message 1 or the message 3. For example, the second field may be a MAC control element (MAC CE), or the second field may be a new logical channel identifier (LCID) field in a MAC subheader. The second field may include the first information.

In some embodiments, the terminal device may include the first information in the second field, for example, information about the REDCAP and type information about the REDCAP is included to indicate that the terminal device is a REDCAP UE. For another example, the terminal device may include the first information in the second field to indicate the type of the terminal device, for example, the terminal device is indicated to be a default terminal device, or the terminal device is indicated to be a terminal device for sending an emergency message.

In the manner 2, the first information is determined based on information about a MAC layer. Therefore, a DU having a MAC layer may obtain the information, to determine that the terminal device is a reduced capability terminal device. According to the manner 2, the base station can more properly schedule the subsequent message 4 and latter messages. In addition, the base station can perform priority processing on access of a common UE and the REDCAP UE. For example, a non-reduced capability terminal device is preferentially accessed. For another example, the base station can further schedule a contention problem between the reduced capability terminal device and the non-reduced capability terminal device more properly.

Similarly, in a 2-step non-contention based random access process, the base station may determine, based on a message A in the random access process (the message A in the 2-step random access process includes the message 1 and the message 3 in a 4-step random access process, that is, the message A is a message obtained by combining the message 1 and the message 3), that the terminal device is a reduced capability terminal device. For a specific manner, refer to the foregoing manner 1 to manner 2. Details are not described herein again.

Step 502: The first DU of the network device sends a second message to a first CU of the network device.

The second message includes second information. The second information indicates the type of the terminal device, and the type of the terminal device includes: The terminal device is a reduced capability terminal device, or the terminal device is a type of a reduced capability terminal device.

Specifically, the second message may be an initial uplink RRC message transfer (initial UL RRC message transfer) message. The second message may include: a newly added first field, where the first field indicates the second information.

Table 1 shows fields that may be included in an initial uplink RRC message transfer message, including, for example, a message type field (Message Type); a DU UE F1 interface application identifier field (gNB-DU UE F1AP ID); an NR configured grant information field (NR CGI); a terminal device identifier field C-RNTI, used by the terminal device to position the DU of the network device; an RRC-container field (RRC-Container), which may include: an uplink message field (UL-CCCH-Message IE or UL-CCCH1-Message IE); a DU to CU RRC-container field (DU to CU RRC-Container); an SUL access indication field (Access Indication); a transaction identifier field (Transaction ID); a RAN UE identifier field (RAN UE ID); an RRC-container set field (RRC-Container-RRCSetupComplete), carrying an uplink control information element (UL-DCCH-Message IE) in an RRC set message (RRCSetupComplete message); and a terminal device type field (UE type).

TABLE 1

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-DU UE F1AP ID | M | | 9.3.1.5 | | YES | reject |
| NR CGI | M | | 9.3.1.12 | NG-RAN Cell Global Identifier (NR CGI) | YES | reject |
| C-RNTI | M | | 9.3.1.32 | C-RNTI allocated at the gNB-DU | YES | reject |
| RRC-Container | M | | 9.3.1.6 | Includes the UL-CCCH-Messsage IE or UL-CCCH1-Message IE as defined in subclause 6.2 of TS 38.331 [8]. | YES | reject |
| DU to CU RRC Container | O | | OCTET STRING | CellGroupConfig IE as defined in subclause 6.3.2 in TS 38.331 [8]. Required at least to carry SRB1 configuration. The ReconfigurationWith Sync field is not included in the CellGroupConfig IE. | YES | reject |
| SUL Access Indication | O | | ENUMERATED (true, . . . ) | | YES | ignore |
| Transaction ID | M | | 9.3.1.23 | | YES | ignore |
| RAN UE ID | O | | OCTET STRING (SIZE (8)) | | YES | ignore |
| RRC-Container-RRCSetupComplete | O | | 9.3.1.6 | Includes the UL-DCCH-Message IE including the RRCSetupComplete message, as defined in subclause 6.2 of TS 38.331 [8]. | YES | ignore |

TABLE 1-continued

| IE/Group Name | Presence | Range | IE type and reference | Semantics description | Criticality | Assigned Criticality |
|---|---|---|---|---|---|---|
| UE type | O | | 9.3.1.X | Includes UE type information | YES | reject or ignore |

For example, as shown in Table 2, the first field may indicate the type of the terminal device (UE type), and the second information of the first field may include any one of the following: a REDCAP, a type of a REDCAP, or another UE type.

For example, an identifier of the terminal device may be used to identify the type of the terminal device. For example, identifier=0 indicates that no type is configured for the terminal device. Identifier=1 indicates that the terminal device is a REDCAP terminal device. Identifier=2 indicates that the terminal device is an NB-IoT terminal device. Identifier=3 to 10 are reserved for future use. Identifier=11 indicates that the terminal device is a terminal device corresponding to an access class 11, and so on.

In this embodiment of this application, the type information may indicate the type of the terminal device in a plurality of manners. In an example, the type information may include four bits, and the UE type has 16 values in total. For example, when a value of the four bits is 0000, it indicates that the UE type=0, which is corresponding to a type of a terminal device, for example, a high capability terminal device with four antennas. When a value of the four bits is 0001, it indicates that the UE type=1, which is corresponding to a type of a terminal device, for example, a reduced capability terminal device with one antenna. When a value of the four bits is 0010, it indicates that the UE type=2, which is corresponding to a type of a terminal device, for example, a reduced capability terminal device with two antennas, and so on. In this way, a second network device may determine the type of the terminal device based on the UE type indicated by the type information. For example, if the UE type=1, the terminal device may be determined as a first-type terminal device. In still another example, the type information may include one bit. If a value of the bit is 1, it indicates that the terminal device is the first-type terminal device. If a value of the bit is 0, it indicates that the terminal device is not the first-type terminal device. In still another example, considering that the terminal device in this embodiment of this application may be a REDCAP terminal device or an NB-IoT terminal device, the type information may include two bits, and a value of one bit is used to indicate whether the terminal device is a REDCAP terminal device (for example, if the value is 1, it indicates that the terminal device is a REDCAP terminal device; or if the value is 0, it indicates that the terminal device is not a REDCAP terminal device), the other bit is used to indicate whether the terminal device is an NB-IoT terminal device (for example, if the value is 1, it indicates that the terminal device is an NB-IoT terminal device; or if the value is 0, it indicates that the terminal device is not an NB-IoT terminal device). Alternatively, the type information may include two bits, and values of the two bits are jointly used to indicate the type of the terminal device. For example, 00 indicates that the terminal device is a REDCAP terminal device, 01 indicates that the terminal device is an NB-IoT terminal device, 10 indicates that the terminal device is neither a REDCAP terminal device nor an NB-IoT terminal device, and 11 is reserved for future use.

TABLE 2

| IE/Group Name | Presence | Range | IE type and reference | Semantics description |
|---|---|---|---|---|
| UE type | O | | ENUMERATED (REDCAP, . . .) | UE type information |

It should be noted that, in this embodiment of this application, the second message may alternatively be a message sent by another DU to the CU in the random access process. For example, the second message is a newly added message and is used to carry the first field, so that the DU can send the second message to the CU, to notify the CU whether the terminal device is a reduced capability terminal device.

Step 503: The first CU may control, based on the second information, the terminal device to access the network.

For example, when the CU of the network device determines that current network load is heavy, the first CU of the network device may reject access of the reduced capability terminal device. Alternatively, when the first CU of the network device determines that current network resources are robust, the first CU of the network device may allow access of the reduced capability terminal device. It should be noted that, step 503 is an optional step.

Example 2

Figure 6:
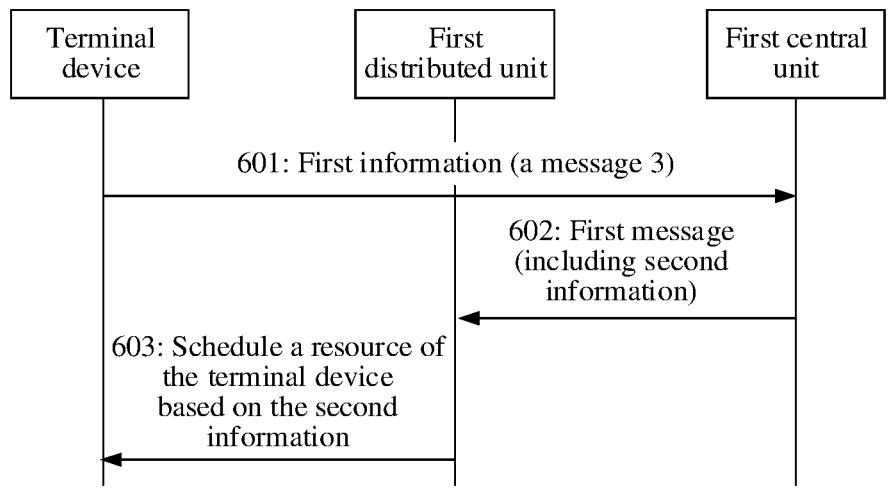
FIG. 6 is a schematic flowchart of a communication method according to an embodiment of this application.

Based on the foregoing architecture, an embodiment of this application provides a communication method, to implement an access procedure of a terminal device after the foregoing architecture provided in embodiments of this application is applied. As shown in FIG. 6, the method may include the following steps.

Step 601: The terminal device sends first information to a first CU of a network device through a first DU of the network device.

The first information indicates a type of the terminal device, and the type of the terminal device includes: The terminal device is a REDCAP terminal device, or the type of the terminal device is a type of a reduced capability terminal device.

In some embodiments, when accessing the network device, the terminal device may send the first information to a CU of the network device through a message 3 in a random access process through a DU of the network device. Specifically, the DU of the network device first receives the message 3 sent by the UE but does not parse content of an RRC message in the message 3, and sends the RRC message in the message 3 to the CU of the network device. Correspondingly, the CU of the network device receives, through the message 3 in the random access process, the first information sent by the terminal device, so that the type of the UE can be identified.

A manner 3 in which the CU of the network device receives, through the message 3 in the random access process, the first information sent by the UE is described below by using an example.

Manner 3: The terminal device is determined as a reduced capability terminal device based on the RRC message in the message 3 in the random access process.

In some embodiments, the terminal device may use a reserved field in the RRC message (for example, an RRC-SetupRequest message) carried in the message 3 as a first field. In other words, the RRC message carried in the message 3 includes the first field. The first field includes the first information, and is used to indicate whether the UE is a REDCAP UE.

In some other embodiments, the terminal device may expand a size of the RRC message carried in the message 3. For example, a field newly added to the RRC message is used as the first field. In other words, the RRC message carried in the message 3 includes the first field. The first field includes the first information, and is used to indicate whether the UE is a REDCAP UE.

In some other embodiments, the terminal device may introduce a new common control channel and a new RRC message as the RRC message in the message 3. The new RRC message includes the first field, and the first field includes the first information, and is used to indicate whether the UE is a REDCAP UE.

According to the manner 3, the base station can control access of the REDCAP UE earlier. For example, the REDCAP UE is rejected to access the network upon a scarcity of network resources. For another example, when the network resources are robust, the REDCAP UE is allowed to access the network.

Considering that the information identified in the manner 3 is information about an RRC layer, only a CU having an RRC layer can obtain the information, to determine that the terminal device is a reduced capability terminal device. A DU having a PHY layer and a MAC layer does not know the identification information of the REDCAP UE, and cannot properly schedule a subsequent message or perform priority processing for access of the UE.

Similarly, in a 2-step non-contention based random access process, the base station may determine, based on a message A in the random access process (the message A in the 2-step random access process includes the message 1 and the message 3 in a 4-step random access process, that is, the message A is a message obtained by combining the message 1 and the message 3), that the terminal device is a reduced capability terminal device. For a specific manner, refer to the foregoing manner 3. Details are not described herein again.

Step 602: The first CU of the network device sends a first message to the first DU of the network device.

The first message includes second information. The second information indicates the type of the UE, and the type of the terminal device includes: The terminal device is a REDCAP terminal device.

In some embodiments, the first message may be a downlink RRC message transfer (DL RRC message transfer) message sent by the CU of the network device to the DU of the network device. In this case, the first message may include a newly added first field, and the first field carries the second information.

Table 3 shows fields that may be included in a downlink RRC message transfer message, including, for example, a message type field (Message Type); a CU UE F1 interface application identifier field (gNB-CU UE F1AP ID); a DU UE F1 interface application identifier field (gNB-DU UE F1AP ID); an old DU UE F1 interface application identifier field (old gNB-DU UE F1AP ID), which is used when an RRC container includes information about RRC connection setup; a new DU UE F1 interface application identifier field (new gNB-DU UE F1AP ID); an SRB identifier field (SRB ID); an execute duplication field (Execute Duplication); an RRC-container field (RRC-Container), which may include: a downlink message field (DL-DCCH-Message IE); a RAT frequency priority information field (RAT-Frequency Priority Information); an RRC delivery status request field (RRC Delivery Status Request); a terminal device context not retrievable field (UE Context not retrievable); a redirected RRC message field (redirected RRC message); a field of PLMN assistance information for network sharing (PLMN Assistance Info for Network Sharing); and the first field, for example, a terminal device type field (UE type).

TABLE 3

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| gNB-CU UE F1AP ID | M | | 9.3.1.4 | | YES | reject |
| gNB-DU UE F1AP ID | M | | 9.3.1.5 | | YES | reject |
| old gNB-DU UE F1AP ID | O | | 9.3.1.5 | Include it if RRCConnectionReestablishment is included in RRC-Container | YES | reject |
| SRB ID | M | | 9.3.1.7 | | YES | reject |
| Execute Duplication | O | | ENUMERATED (true, . . . ) | | YES | ignore |
| RRC-Container | M | | 9.3.1.6 | Includes the DL-DCCH-Message IE as defined in subclause 6.2 of TS 38.331 [8] encapsulated in a PDCP PDU, or the DL-CCCH-Message IE as defined in subclause 6.2 of TS 38.331 [8]. | YES | reject |
| RAT-Frequency Priority Information | O | | 9.3.1.34 | | YES | reject |

TABLE 3-continued

| IE/Group Name | Presence | Range | IE type and reference | Semantics description | Criticality | Assigned Criticality |
|---|---|---|---|---|---|---|
| RRC Delivery Status Request | O | | ENUMERATED (true, . . . ) | Indicates whether RRC DELIVERY REPORT procedure is requested for the RRC message. | YES | ignore |
| UE Context not retrievable | O | | ENUMERATED (true, . . . ) | | YES | reject |
| Redirected RRC message | O | | RRC Container 9.3.1.6 | Includes the UL-CCCH-Message IE as defined in subclause 6.2 of TS 38.331 [8]. | YES | reject |
| PLMN Assistance Info for Network Sharing | O | | PLMN Identity 9.3.1.14 | | YES | ignore |
| New gNB-CU UE F1AP ID | O | | gNB-CU UE F1AP ID 9.3.1.4 | | YES | reject |
| UE type | O | | 9.3.1.X | Includes UE type information | YES | reject or ignore |

For example, with reference to Table 3 and Table 2, the first field carried in the first message may be used to indicate the type of the terminal device (UE type), and a value range of the first field may include: a REDCAP, a type of a REDCAP, or another UE type. For example, an identifier of the terminal device may be used to identify the type of the terminal device, and identifier=0 indicates that no parameter is configured for the terminal device. Identifier=1 indicates that the terminal device is a REDCAP terminal device. Identifier=2 indicates that the terminal device is an NB-IoT terminal device. Identifier=3 to 10 are reserved for future use. Identifier=11 indicates that the terminal device is a terminal device corresponding to an access class 11, and so on. Certainly, reference may also be made to the manner of setting the type of the terminal device in the foregoing example. For example, correspondingly set types of reduced capability terminal devices include a reduced capability terminal device with two antennas whose corresponding identifier=3, and a reduced capability terminal device with one antenna whose corresponding identifier=4. Details are not described herein again.

In some other embodiments, the first message may alternatively be a terminal device context setup request (UE context setup request) message. In this case, a first field may be newly added to the terminal device context setup request message, so that the first field carries the second information and is used to indicate whether the terminal device is a reduced capability terminal device.

It should be noted that, in this embodiment of this application, the first message may alternatively be a message sent by another CU to the DU in the random access process or a newly added message used to carry the first field, so that the CU can send the first message to the DU, to notify the DU whether the terminal device is a reduced capability terminal device.

Step 603: The first DU may schedule a subsequent random access message or another message for the reduced capability terminal device based on the second information.

It should be noted that, step 603 is an optional step. For example, the first DU of the network device schedules a subsequent message 4 or message 5 within a capability range of the reduced capability terminal device. Specifically, the first DU may configure a corresponding resource for the reduced capability terminal device. For a specific configured resource, refer to the descriptions in the random access process in FIG. 4. Details are not described herein again.

Optionally, the first CU of the network device may determine an access priority of the reduced capability terminal device for the reduced capability terminal device based on the second information.

For example, the first CU of the network device may set the access priority of the reduced capability terminal device to a low priority, and set the access priority of a non-reduced capability terminal device to a high priority, so that when a reduced capability terminal device and a non-reduced capability terminal device access the network at the same time, the non-reduced capability terminal device is preferential to access the network.

After the foregoing access procedure of the terminal device is completed, the terminal device may further need to be handed over due to poor signal quality of a current cell caused by movement of the terminal device or congestion due to case that the base station currently accesses a large quantity of terminal devices. The CU of the network device may initiate a handover procedure based on a stored context of the terminal device, to ensure that in the handover process, the terminal device can set up an RRC connection without re-initiating a random access process, thereby reducing a delay and reducing signaling overheads. In addition, a new RRC state is considered: In an inactive state, the RRC connection between the terminal device and the network is suspended, to achieve a power saving effect the same as that in an idle state. Different from the idle state, in the inactive state, the terminal device and an access network device store the context of the terminal device. When the terminal device needs to enter a connected state, for example, when the terminal device has uplink data to send, or when the network device pages the terminal device to enter the connected state, the terminal device enters the connected state based on the stored context of the terminal device, thereby reducing the delay and reducing the signaling overheads. The following uses an example to describe a context setup procedure of the terminal device. For details, refer to FIG. 7.

Step 701: The terminal device sends capability information to the CU of the network device.

The capability information indicates a capability of the terminal device.

Optionally, the capability information indicates that the terminal device has a capability of transmitting data in the inactive state, and the capability indicates that the terminal device has a capability of transmitting uplink information in a configured grant or a scheduling grant in the inactive state. The uplink information includes but is not limited to uplink signaling and uplink data. The uplink signaling may be uplink RRC signaling or the like, and the uplink data may be uplink service data, for example, video data or audio data.

It should be noted that, the scheduling grant refers to a resource allocated by the network device to the terminal device based on a resource request sent by the terminal device. For example, the resource request may be a preamble in the random access process, or may be an uplink scheduling request or the like. The configured grant refers to a resource preconfigured by the network device, and the terminal device does not need to send a resource request. The resource is allocated once and used for a plurality of times.

It should be noted that, the terminal device has a plurality of capabilities, and the capability information may further indicate another capability of the terminal device. This is not limited in this embodiment of this application.

It should be noted that, the CU of the network device may further obtain the capability information of the terminal device from a core network device. If the CU of the network device obtains the capability information of the terminal device from the core network device, the CU of the network device does not need to obtain the capability information of the terminal device from the terminal device, that is, in this case, the terminal device does not need to send the capability information to the CU of the network device.

Step 702: The CU of the network device sends a UE context setup request message to the DU of the network device.

The UE context setup request message may be used to request to set up a context for the terminal device.

Optionally, the UE context setup request message may include the capability information.

Step 703: The DU of the network device sets up the context for the terminal device, and sends a UE context setup response message to the CU of the network device.

It should be noted that, in this embodiment of this application, the context may include an air interface context and an F1 context.

The air interface context may refer to an RLC layer configuration, a MAC layer configuration, physical layer configuration information, an I-RNTI, a C-RNTI, and the like of the terminal device, and may further include "a configured grant for data transmission in the inactive state", PDCCH configuration information for sending physical layer feedback information, and an RNTI for scrambling a PDCCH. The F1 context may refer to an F1AP ID, transport layer address information for F1 data transmission, and the like. DRB data of the terminal device is transmitted between the CU of the network device and the DU of the network device, and may also be referred to as F1 data transmission.

In this embodiment of this application, the context set up by the DU of the network device for the terminal device may include one or more of the following:

1. Configuration information of the physical downlink control channel (PDCCH) configured for the terminal device. The configuration information of the PDCCH may be used to send feedback information of the uplink data or schedule PUSCH transmission, schedule physical downlink shared control channel (PDSCH) transmission, and the like.

The configuration information of the PDCCH includes but is not limited to resource location information, a period, a start location, and the like of the PDCCH.

In this embodiment of this application, the PDCCH may schedule sending of physical layer signaling, for example, at least one of acknowledgment (ACK) or negative-acknowledgement (NACK) signaling, an uplink grant for initial transmission, and an uplink grant for retransmission. The PDCCH may further schedule sending of the PDSCH, and information carried in the PDSCH includes but is not limited to one or more of downlink RRC signaling, downlink data, and a command for timing advance. The terminal device may perform uplink transmission and downlink transmission based on scheduling of the PDCCH.

2. A temporary identifier for scrambling the PDCCH. The temporary identifier is a 32-bit radio network temporary identifier (RNTI) for scrambling the PDCCH. For example, the temporary identifier may be a cell radio network temporary identifier (C-RNTI) of the terminal device.

3. Configuration information of an RLC layer that is of a radio bearer and that is configured for the terminal device.

4. Configuration information of a MAC layer configured for the terminal device.

5. An inactive radio network temporary identifier (I-RNTI) configured for the terminal device.

6. A configured grant configured for the terminal device. The configured grant may be used to indicate an uplink resource allocated to the terminal device. The configured grant may include but is not limited to one or more of a physical uplink shared channel (PUSCH), a frequency domain resource, a period, a start location, and data demodulation reference information.

Optionally, the configured grant may be configured for a terminal device in the inactive state, and the terminal device in the inactive state may send one or more of the uplink RRC signaling and the uplink data using the configured grant.

Optionally, a time-frequency resource configured by the configured grant may be a dedicated time-frequency resource for the terminal device, that is, a time-frequency resource that is not shared with another terminal device. In this case, the DU of the network device may establish a mapping relationship between the configured grant and the context of the terminal device and a mapping relationship between the configured grant and a data transmission channel of the terminal device.

Optionally, the time-frequency resource configured by the configured grant may be a time-frequency resource that is shared by the terminal device with another terminal device. In this case, when determining that the terminal device enters the inactive state, the CU of the network device may send an inactive-state I-RNTI to the DU of the network device. The DU of the network device may establish a mapping relationship between the configured grant and the I-RNTI of the terminal device. The I-RNTI may be a unique identifier of the terminal device in the inactive state in a radio network-based notification area (RNA).

It should be noted that, the foregoing is merely an example, and the context of the terminal device may further include other information. This is not limited in this embodiment of this application. Details are not described by using examples herein again. For example, the UE context setup response message sent by the CU of the network device may include the context of the terminal device.

Figure 7:
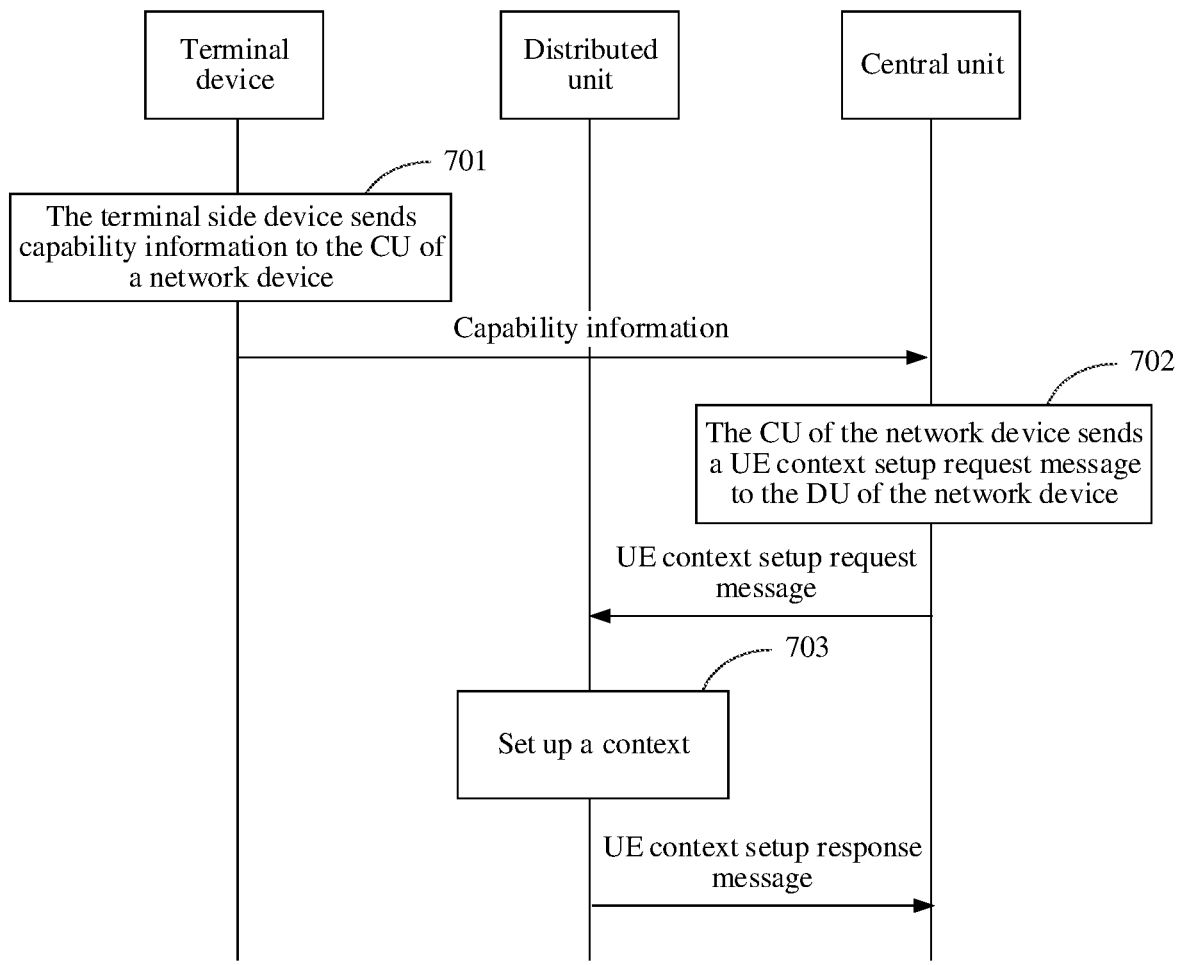
FIG. 7 is a schematic flowchart of a context setup method.

In the procedure shown in FIG. 7, only main steps are described. There may be other steps in the process of setting up the context for the terminal device. Details are not described herein again. The context of the terminal device is set up according to the procedure shown in FIG. 7.

Considering that after leaving a coverage range of an access network device that originally stores the context, the terminal device needs to initiate an RRC resumption procedure to a new access network device. The following describes specific scenarios by using examples.

Scenario 1

Figure 8:
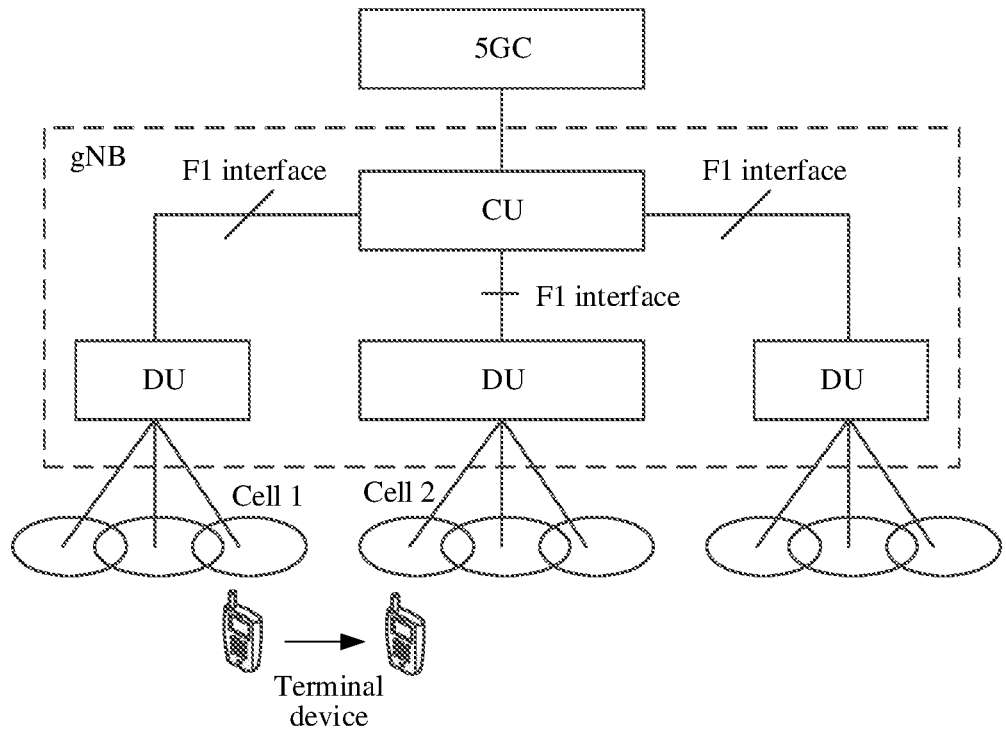
FIG. 8 is a schematic diagram of an application scenario to which an embodiment of this application is applicable.

As shown in FIG. 8, a terminal device moves from a cell 1 to a neighboring cell 2. In this case, the CU may remain unchanged, and the terminal device is handed over from a DU of a source network device to a DU of a target network device. In this case, the source network device (for example, a fourth network device) includes a first CU and a second DU, and the target network device (for example, a first network device) includes a first CU and a first DU.

For the network device in the CU-DU architecture, the CU of the network device is responsible for managing an RRC state of the terminal device. The CU of the network device stores a context of the terminal device (including capability information of the terminal device and configuration information of another terminal device). In a scenario in which the CU of the network device remains unchanged and the DU of the network device is handed over, the CU of the network device may send the context of the terminal device to the DU of the target network device, and the DU of the target network device initiates a random access process of the terminal device for the terminal device based on the received context of the terminal device, and allocate a preamble and a C-RNTI that are used by the DU that accesses the target network device, so that the terminal device can access the CU of the network device through the DU of the target network device. In this way, the random access process of the terminal device is completed.

In a handover process, the CU of the network device may not include second information indicating whether the terminal device is a reduced capability terminal device. For example, when a handover occurs, based on the UE capability information carried in the context of the terminal device, it cannot be determined that the UE is a reduced capability terminal device. In this case, the DU of the target network device cannot allocate, to the reduced capability terminal device, a preamble or a C-RNTI that matches the reduced capability terminal device. In this case, the DU of the target network device cannot properly schedule a subsequent message or cannot perform priority processing for access of the UE.

Figure 9:
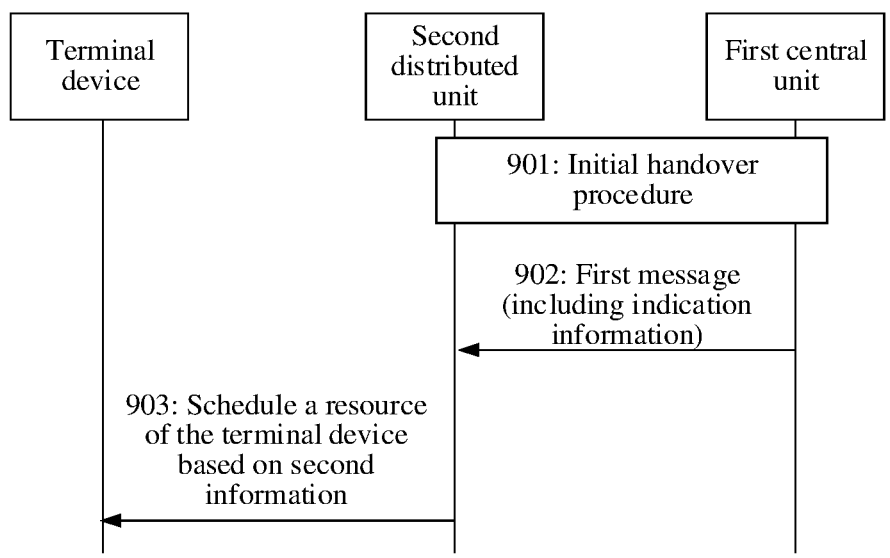
FIG. 9 is a schematic flowchart of a communication method according to an embodiment of this application.

Based on the foregoing problem, an embodiment of this application provides a communication method. As shown in FIG. 9, the communication method includes the following steps.

Step 901: The first CU initiates an initial handover procedure of a handover to the first DU.

A specific handover manner may be that the first CU initiates a handover request for a handover to the first DU.

For example, the first DU is a target DU, and the second DU is a source DU. The handover request may be used to request to hand over the terminal device to the target DU. After receiving the handover request, the target DU triggers a handover procedure of the terminal device based on the handover request.

In some embodiments, after receiving a measurement report of the terminal device, the first CU may determine, based on the measurement report, that the terminal device needs to be handed over. Specifically, when the first CU determines, based on the received measurement report, that current communication quality of the terminal device is poor, the terminal device may be handed over. In this case, the handover request is sent to a first entity.

Further, the foregoing measurement reporting procedure of the terminal device may be actively triggered by the first CU or may be performed actively by the terminal device. Optionally, the handover request includes one or more of the following information: an identifier of a to-be-handed-over terminal device, an identifier of a target cell, and target frequency information.

In a possible implementation, the first CU may further receive a cell congestion state report sent by the second DU. If the report indicates that the cell is currently in a congestion state, the CU of the network device may correspondingly determine an alleviation policy for alleviating the cell congestion state (for example, releasing a low-priority GBR, releasing an edge user, and the like), and send a cell congestion alleviation request to the first entity, where the request includes the determined alleviation policy. The first entity may perform alleviation processing according to the alleviation policy. The cell congestion state report includes one or more of the following information: a cell identifier and a bearer type (for example, a GBR or a nonGBR), an ARP, a congestion type (for example, GBR congestion or non-GBR congestion), a congestion level (for example, severe, minor, non-congested), and the like.

Step 902: The first CU sends a first message to the first DU.

The first message may include second information. The second information indicates a type of the terminal device, and the type of the terminal device includes: The terminal device is a reduced capability terminal device, or the type of the terminal device is a type of a reduced capability terminal device.

In some embodiments, the first message may be a terminal device context request (UE context setup request) message sent by the first CU to the first DU. The first message may include a first field. The first field may be a field newly added to the UE context request message. The first field is used to indicate or identify UE information, or is used to indicate or identify UE type information. For another example, the first field may be in a CU to DU RRC information (CU to DU RRC information) field in the UE context request message.

Table 4 shows fields that may be included in a UE context request message, including, for example, a configured grant confirmation information field (CG-ConfigInfo); a configured grant confirmation field (CG-Config); a terminal device capability RAT list field (UE-capabilityRAT-containerLis); a measurement information field (MeasConfig); a handover preparation information field (handover preparation information); a cell group information field (CellGroupConfig); a measurement timing configuration field (measurement timing configuration); and the first field, for example, a terminal device type field (UE type).

TABLE 4

| IE/Group Name | Presence | Range | IE type and reference | Semantics description | Criticality | Assigned Criticality |
|---|---|---|---|---|---|---|
| CG-ConfigInfo | O | | OCTET STRING | CG-ConfigInfo, as defined in TS 38.331 [8]. | — | |
| UE-CapabilityRAT-ContainerList | O | | OCTET STRING | This IE is used in the NG-RAN and it consists of the UE-CapabilityRAT-ContainerList, as defined in TS 38.331 [8]. | — | |
| MeasConfig | O | | OCTET STRING | MeasConfig, as defined in TS 38.331 [8] (without MeasGapConfig). For EN-DC/NGEN-DC operation, includes the list of FR2 frequencies for which the gNB-CU requests the gNB-DU to generate gaps. For NG-RAN, NE-DC and MN for NR-NR DC, includes the list of FR1 and/or FR2 frequencies for which the gNB-CU requests the gNB-DU to generate gaps and the gap type (per-UE or per-FR). | — | |
| Handover Preparation Information | O | | OCTET STRING | HandoverPreparationInformation, as defined in TS 38.331 [8]. | YES | ignore |
| CellGroupConfig | O | | OCTET STRING | CellGroupConfig, as defined in TS 38.331 [8]. | YES | ignore |
| Measurement Timing Configuration | O | | OCTET STRING | Contains the MeasurementTimingConfiguration inter-node message defined in TS 38.331 [8]. In EN-DC/NGEN-DC, it is included when the gaps for FR2 are requested to be configured by the MeNB. For MN in NR-NR DC, it is included when the gaps for FR2 and/or FR1 are requested by the SgNB | YES | ignore |
| UEAssistanceInformation | O | | OCTET STRING | UEAssistanceInformation, as defined in TS 38.331 [8]. | YES | ignore |
| CG-Config | O | | OCTET STRING | CG-Config, as defined in TS 38.331 [8]. | YES | ignore |
| UE type | O | | ENUMERATED (REDCAP, ...) | Includes UE type information | YES | reject or ignore |

(Critical Assign appears next to Handover Preparation Information row)

For example, with reference to Table 4 and Table 2, the first field carried in the first message may be used to indicate the type of the terminal device (UE type), and a value range of the first field may include: a REDCAP, a type of a REDCAP, or another UE type. For example, an identifier of the terminal device may be used to identify the type of the terminal device, and identifier=0 indicates that no parameter is configured for the terminal device. Identifier=1 indicates that the terminal device is a REDCAP terminal device. Identifier=2 indicates that the terminal device is an NB-IoT terminal device. Identifier=3 to 10 are reserved for future use. Identifier=11 indicates that the terminal device is a terminal device corresponding to an access class 11, and so on.

Step 903: The first DU may schedule a subsequent random access message or another message for the reduced capability terminal device based on the second information.

It should be noted that, step 603 is an optional step. For example, the DU of the network device schedules a message (for example, a message 4 or a message 5) in a subsequent random access process within a capability range of the reduced capability terminal device. Specifically, the first DU may configure a corresponding resource for the reduced capability terminal device. For a specific configured resource, refer to the descriptions in the random access process in FIG. 4. Details are not described herein again.

Optionally, the first CU may determine an access priority of the reduced capability terminal device for the reduced capability terminal device based on the second information.

For example, the first CU may set the access priority of the reduced capability terminal device to a low priority, and set the access priority of a non-reduced capability terminal device to a high priority, so that when a reduced capability terminal device and a non-reduced capability terminal device access the network at the same time, the non-reduced capability terminal device is preferential to access the network.

Scenario 2

Figure 10:
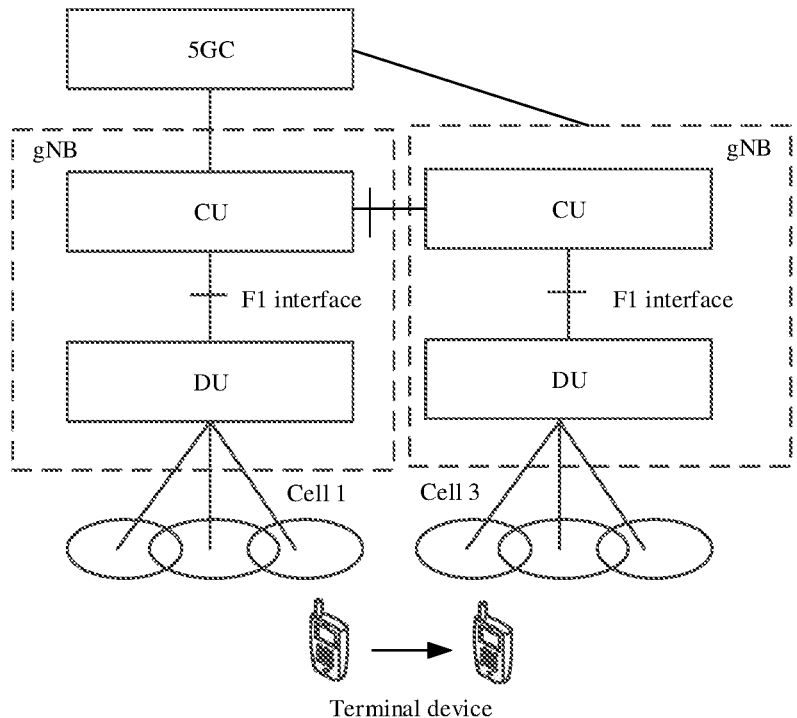
FIG. 10 is a schematic diagram of an application scenario to which an embodiment of this application is applicable.

As shown in FIG. 10, a terminal device moves from a cell 1 to a cell 3. In this case, the terminal device is handed over from a CU of a source network device to a CU of a target network device, and the terminal device is handed over from a DU of the source network device to a DU of the target network device. In this case, the source network device (for example, a second network device) includes a second CU and a second DU, and the target network device (for example, a first network device) includes a first CU and a first DU.

Figure 11:
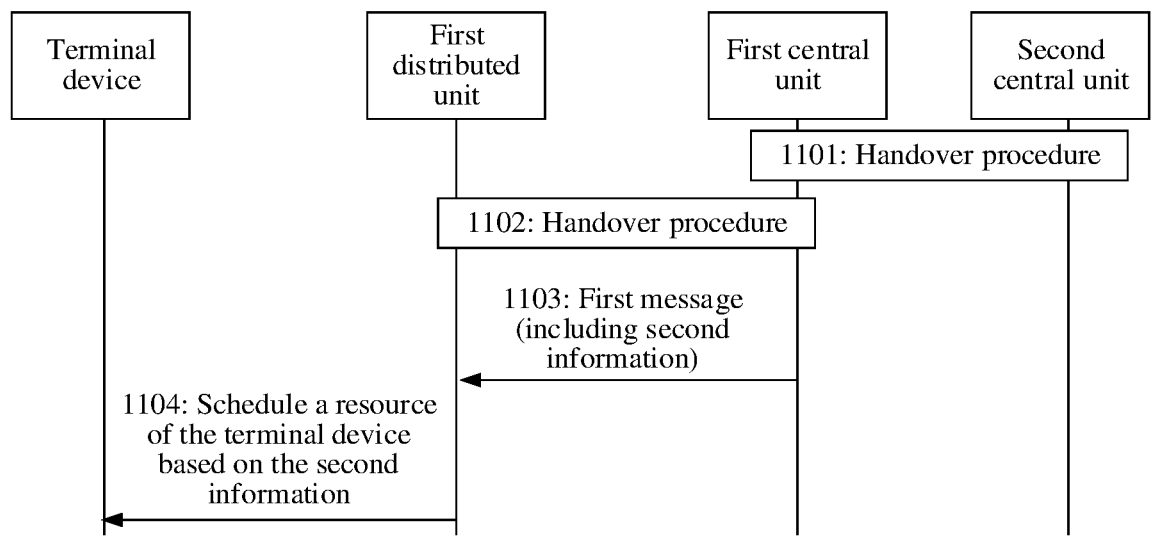
FIG. 11 is a schematic flowchart of a communication method according to an embodiment of this application.

An embodiment of this application provides a communication method. As shown in FIG. 11, the communication method includes the following steps.

Step 1101: The second CU initiates a handover procedure to the first CU.

For example, the CU of the source network device is the second CU, the CU of the target network device is the first CU, the DU of the source network device is the second DU, and the DU of the target network device is the first DU. In this case, the second CU stores a context of the terminal device. In a handover process, the second CU may send the context of the terminal device (for example, which may include capability information of the terminal device) to the CU of the target network device through a UE context request message. For a specific handover process, refer to step 901. Details are not described herein again.

The context request message of the UE may include second information, and the second information indicates information about whether the UE is a reduced capability terminal device.

Step 1102: The first CU initiates a handover procedure to the first DU.

The CU of the target network device sends the context of the terminal device (for example, which may include the capability information of the terminal device) to the DU of the target network device, and the DU of the target network device allocates, to the terminal device based on the received context of the terminal device, a preamble and a C-RNTI that are used by the DU that accesses the target network device. In this way, the random access process of the terminal device is completed. For a specific handover process, refer to step 901. Details are not described herein again.

Step 1103: The first CU sends a first message to the first DU.

The first message may include the second information. The second information indicates a type of the terminal device. The type of the terminal device includes: The terminal device is a reduced capability terminal device, or the type of the terminal device is a type of a reduced capability terminal device.

In some embodiments, the first message may be a UE context request (UE context setup request) message sent by the first CU to the first DU. The first message may include a first field. The first field may be a field newly added to the UE context request message. The first field is used to indicate or identify UE information, or is used to indicate or identify UE type information. For another example, the first field may be in a CU to DU RRC information (CU to DU RRC information) field in the UE context request message.

Step 1104: The first DU may schedule a subsequent random access message or another message for the reduced capability terminal device based on the second information.

It should be noted that, step 603 is an optional step. For example, the first DU schedules a message (for example, a message 4 or a message 5) in a subsequent random access process within a capability range of the reduced capability terminal device. Specifically, the first DU may configure a corresponding resource for the reduced capability terminal device. For a specific configured resource, refer to the descriptions in the random access process in FIG. 4. Details are not described herein again.

Optionally, the first CU may determine an access priority of the reduced capability terminal device for the reduced capability terminal device based on the second information.

For example, the first CU may set the access priority of the reduced capability terminal device to a low priority, and set the access priority of a non-reduced capability terminal device to a high priority, so that when a reduced capability terminal device and a non-reduced capability terminal device access the network at the same time, the non-reduced capability terminal device is preferential to access the network.

It should be noted that, not all of the foregoing steps 1101 to 1104 need to be performed. In some embodiments, some of steps 1101 to 1104 may be performed, for example, step 1101, step 1103, and step 1104 are performed, or step 1102, step 1103, and step 1104 are performed. This is not limited herein.

Scenario 3

When an RRC state of a terminal device changes, a CU of a network device needs to notify a DU of the network device to perform associated context processing. Specifically, in a process in which the terminal device changes from an RRC connected state to an inactive state, the CU of the network device notifies the DU of the network device to release a context of the terminal device. The context includes all dedicated F1 transmission resources, configuration information of an air interface, and the like. If the DU of the network device releases the context of the terminal device, when the terminal device in the inactive state sends uplink data to the DU of the network device, the DU of the network device cannot immediately send the data to the CU of the network device.

When the terminal device moves in the inactive state, for example, moves from a cell 1 to a cell 3, in this case, the terminal device needs to re-initiate an RRC state resume request. In a process of completing a handover from a DU of a source network device to a DU of a target network device, or in a process of a handover from a CU of the source network device to a CU of the target network device and a handover from the DU of the source network device to the DU of the target network device, if the UE cannot be directly identified as a REDCAP UE based on UE capability information, the DU of the network device does not know that the UE is a REDCAP UE when allocating a preamble or a C-RNTI, and the DU of the network device cannot know, based on the preamble in a message 1 or the C-RNTI in a message 3, that the UE is a REDCAP UE. As a result, a subsequent message cannot be properly scheduled or priority processing cannot be performed for access of the UE. The following describes an example in which the source network device (for example, a second network device) includes a second CU and a second DU, the target network device (for example, a first network device) includes a first CU and a first DU. For a manner in which the source network device (for example, a third network device) includes a first CU and a second DU, and the target network device (for example, the first network device) includes a first CU and a first DU, refer to this embodiment.

Figure 12:
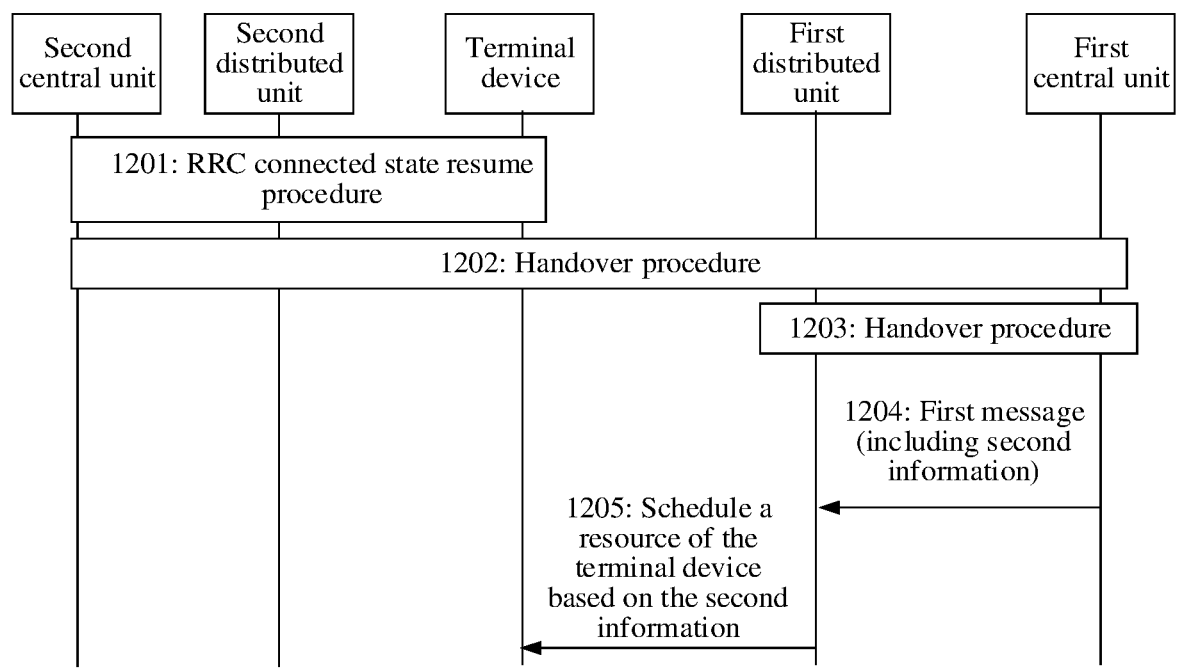
FIG. 12 is a schematic flowchart of a communication method according to an embodiment of this application.

Based on the foregoing problem, an embodiment of this application provides a communication method. As shown in FIG. 12, the communication method includes the following steps.

Step 1201: The terminal device initiates an RRC connection resumption procedure to the second CU through the second DU.

For example, the second DU may be the DU of the source network device, and the second CU may be the CU of the source network device. The first DU may be the DU of the target network device, and the first CU may be the CU of the target network device. In this case, the terminal device initiates an RRC connection resume request to the CU of the source network device through the DU of the source network device. The RRC connection resume request is used to request to resume an RRC connected state.

Step 1202: The second CU initiates a handover procedure to the first CU.

In this case, the CU of the source network device determines, based on the RRC connection resume request of the terminal device and a stored context of the terminal device, that the terminal device needs to be handed over. Therefore, the CU of the source network device may send the context of the terminal device (for example, which may include capability information of the terminal device) to the CU of the target network device through the UE context request message.

The context request message of the UE may include second information, and the second information indicates information about whether the UE is a reduced capability terminal device.

Step 1203: The first CU initiates a handover procedure to the first DU.

The CU of the target network device sends the context of the terminal device (for example, which may include the capability information of the terminal device) to the DU of the target network device, and the DU of the target network device allocates, to the terminal device based on the received context of the terminal device, a preamble and a C-RNTI that are used by the DU that accesses the target network device. In this way, the random access process of the terminal device is completed.

Step 1204: The first CU sends a first message to the first DU.

The first message may include the second information. The second information indicates a type of the terminal device. The type of the terminal device includes: The terminal device is a reduced capability terminal device, or the type of the terminal device is a type of a reduced capability terminal device.

In some embodiments, the first message may be a UE context request (UE context setup request) message sent by the first CU to the first DU. The first message may include a first field. The first field may be a field newly added to the UE context request message. The first field is used to indicate or identify UE information, or is used to indicate or identify UE type information. For another example, the first field may be in a CU to DU RRC information (CU to DU RRC information) field in the UE context request message.

Step 1205: The first DU may schedule a subsequent random access message or another message for the reduced capability terminal device based on the second information.

It should be noted that, step 1205 is an optional step. For example, the DU schedules a message (for example, a message 4 or a message 5) in a subsequent random access process within a capability range of the reduced capability terminal device. Specifically, the DU may configure a corresponding resource for the reduced capability terminal device. For a specific configured resource, refer to the descriptions in the random access process in FIG. 4. Details are not described herein again.

Optionally, the CU may determine an access priority of the reduced capability terminal device for the reduced capability terminal device based on the second information.

For example, the CU may set the access priority of the reduced capability terminal device to a low priority, and set the access priority of a non-reduced capability terminal device to a high priority, so that when a reduced capability terminal device and a non-reduced capability terminal device access the network at the same time, the non-reduced capability terminal device is preferential to access the network.

It should be noted that, not all of the foregoing steps 1201 to 1205 need to be performed. In some embodiments, some of steps 1201 to 1205 may be performed, for example, step 1202, step 1204, and step 1205 are performed, or step 1203, step 1204, and step 1205 are performed. This is not limited herein.

Figure 13:
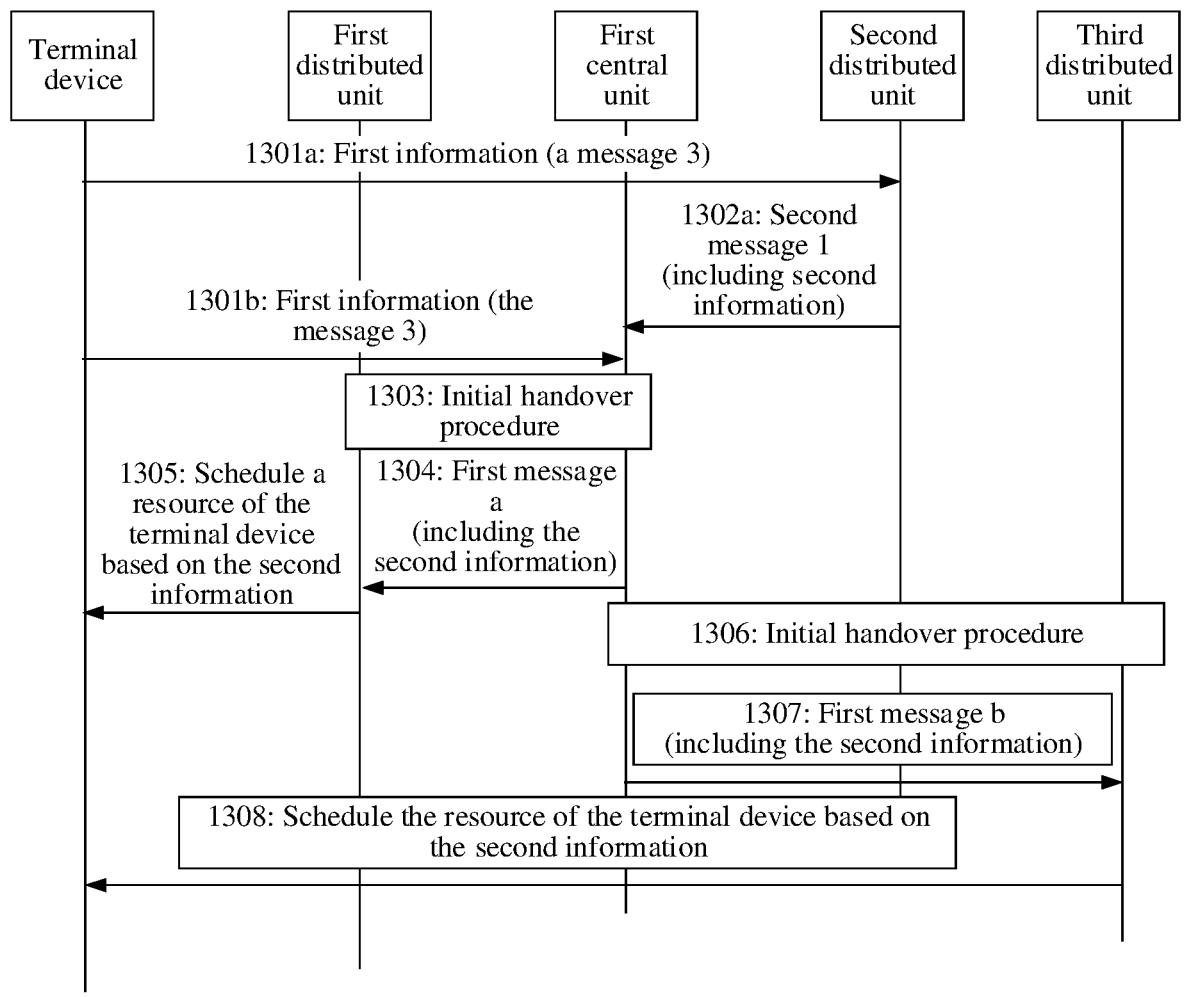
FIG. 13 is a schematic flowchart of a communication method according to an embodiment of this application.

Based on the foregoing problem, an embodiment of this application provides a communication method. A terminal device initially accesses a network through a second distributed unit and a first central unit (for example, a fourth network device), and subsequently accesses the network through a first distributed unit and the first central unit (for example, a first network device), and then indicates to access the network through a third distributed unit and the first central unit (for example, a fifth network device). As shown in FIG. 13, the method includes the following steps.

Step 1301*a*: The terminal device sends first information to the second distributed unit.

In step 1301*a*, the terminal device may access the network through the second distributed unit and the first central unit. In this case, reference may be made to the manner in which the terminal device sends the first information to the first distributed unit in FIG. 5.

Step 1302*a*: The second distributed unit sends a second message to the first central unit.

For the second message, refer to the manner in which the terminal device sends the second message to the first distributed unit in FIG. 5.

Step 1301*b*: The terminal device sends the first information to the first central unit.

In step 1301*b*, the terminal device may access the network through the second distributed unit and the first central unit. In this case, reference may be made to the manner in which the terminal device sends the first information to the central unit through the distributed unit in FIG. 6.

It should be noted that, step 1301*a* and step 1302*a* are a possible implementation, and step 1301*b* is a possible implementation.

Step 1303: The first distributed unit and the first central unit initiate an initial handover procedure of the terminal device.

Optionally, the terminal device may initiate an initial handover from the second distributed unit to the first distributed unit, to access the first distributed unit. For details, refer to the implementation of the handover to the first distributed unit in step 901 in FIG. 9.

Step 1304: The first central unit sends a first message a to the first distributed unit.

For a manner in which the first central unit sends the first message a to the first distributed unit in step 1304, refer to the manner in which the first central unit sends the first message to the first distributed unit in step 902. The first message a may be the same as the first message.

Step 1305: The first distributed unit schedules a resource of the terminal device based on second information.

It should be noted that, step 1305 is an optional step.

Step 1306: The third distributed unit and the first central unit initiate an initial handover procedure of the terminal device.

Optionally, the terminal device may initiate an initial handover from the first distributed unit to the third distributed unit, to access the third distributed unit. For details, refer to the implementation of the handover to the first distributed unit in step 901 in FIG. 9.

Step 1307: The first central unit sends a first message b to the third distributed unit.

For a manner in which the first central unit sends the first message b to the third distributed unit in step 1304, refer to the manner in which the first central unit sends the first message to the first distributed unit in step 902. The first message b may be the same as the first message.

Step 1308: The third distributed unit schedules the resource of the terminal device based on the second information.

It should be noted that, step 1308 is an optional step.

The foregoing manner is described by using only an example in which the first central unit is unchanged. A manner in which a handover is also occurs on the first central unit may be described with reference to the implementations in FIG. 13 and FIG. 12. For example, the terminal device first accesses a second central unit through the second distributed unit, and then the terminal device is handed over to the first central unit and the first distributed unit. Subsequently, the terminal device may be further handed over from the first central unit to a third central unit, and handed over from the first distributed unit to the third distributed unit, that is, the terminal device accesses a third network device (including the third central unit and the third distributed unit).

Certainly, another combination manner may alternatively be used. For a specific manner of sending the first information and the second information in the handover, refer to the foregoing embodiments. Details are not described herein again.

It should be noted that, not all of the foregoing steps 1301a to 1308 need to be performed. This is not limited herein. FIG. 9 to FIG. 13 are merely examples. In an actual process, there may be another step, and details are not described herein again.

Embodiments described in this specification may be independent solutions, or may be combined based on internal logic. All these solutions fall within the protection scope of this application.

In the foregoing embodiments provided in this application, the methods provided in embodiments of this application are separately described from a perspective of an interaction between the devices. To implement the functions in the methods provided in embodiments of this application, the CU of the network device or the DU of the network device may include a hardware structure and/or a software module, and implement the foregoing functions in a form of the hardware structure, the software module, or a combination of the hardware structure and the software module. Whether a function in the foregoing functions is performed by the hardware structure, the software module, or the combination of the hardware structure and the software module depends on particular applications and design constraints of the technical solutions.

In embodiment of this application, the module division is an example, and is merely logical function division, and there may be another division manner in an actual implementation. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 14:
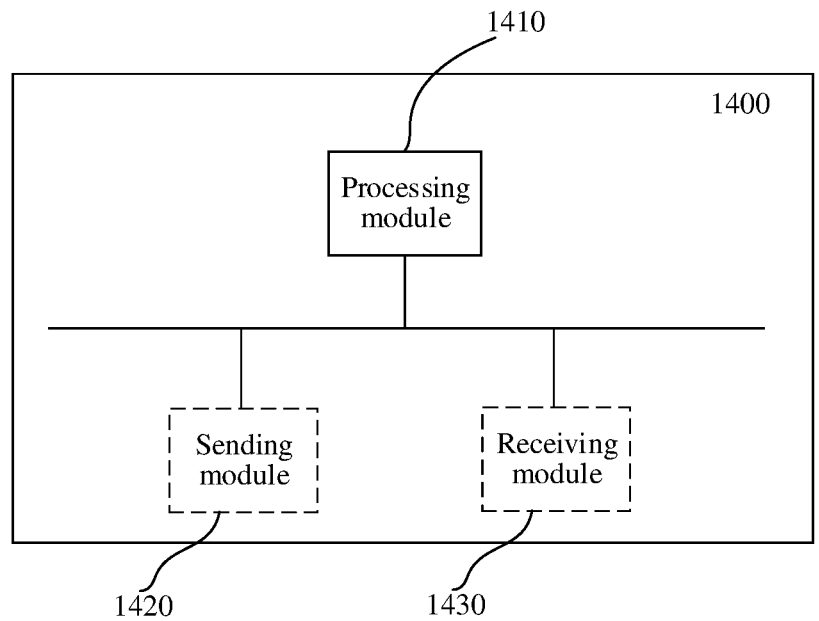
FIG. 14 is a schematic diagram of a communication apparatus according to an embodiment of this application.

As shown in FIG. 14, this application provides a communication apparatus.

In some embodiments, the communication apparatus 1400 may be used for a first central unit of a network device. In this case, the first central unit may include a processing module 1410, and may optionally further include a sending module 1420, and a receiving module 1430.

The processing module 1410 is configured to receive first information from a terminal device through the receiving module 1430, where the first information indicates a type of the terminal device. The processing module 1410 is configured to send second information to a first distributed unit of the network device through the sending module 1420, where the second information indicates the type of the terminal device.

In a possible implementation, the processing module 1410 is configured to receive the first information from the terminal device through the first distributed unit through the receiving module 1430.

In a possible implementation, the processing module 1410 is configured to receive the first information from the terminal device through a second distributed unit through the receiving module 1430, where the second distributed unit is a distributed unit accessed by the terminal device before the terminal device is handed over to the first distributed unit.

In a possible implementation, the processing module 1410 is configured to receive, through the receiving module 1430, the first information sent by a second central unit, where the second central unit is a central unit accessed by the terminal device before the terminal device is handed over to the first central unit.

In a possible implementation, the first distributed unit schedules a resource of the terminal device and/or an access priority of the terminal device based on the second information.

In a possible implementation, the processing module 1410 is configured to send the second information to a third distributed unit through the sending module 1420, where the third distributed unit is a distributed unit to which the terminal device is handed over from the first distributed unit.

In a possible implementation, the processing module 1410 is configured to send the first information to a third central unit through the sending module 1420, where the third central unit is a central unit to which the terminal device is handed over from the first central unit, the first information is to be used by the third central unit to send the second information to a third distributed unit, and the third distributed unit is a distributed unit to which the terminal device is handed over from the first distributed unit.

In a possible implementation, the second information is carried in a first message, the first message includes a first field, and the first field carries the second information.

In some embodiments, the communication apparatus 1400 may be used for a first distributed unit of a network device. In this case, the first distributed unit may include a processing module 1410, and may optionally further include a sending module 1420, and a receiving module 1430.

The processing module 1410 is configured to receive first information from a terminal device through the receiving module, where the first information indicates a type of the terminal device. The processing module 1410 is configured to send second information to a first central unit of the network device through the sending module 1420, where the second information indicates the type of the terminal device.

In a possible implementation, the type of the terminal device includes any one of the following: a reduced capability terminal device, or a type of a reduced capability terminal device.

In a possible implementation, the first central unit controls access of the terminal device based on the second information.

In a possible implementation, the first central unit sends the second information to a third distributed unit, where the third distributed unit is a distributed unit to which the terminal device is handed over from the first distributed unit.

In a possible implementation, the first central unit sends the second information to a third central unit, where the third central unit is a central unit to which the terminal device is handed over from the first central unit.

In a possible implementation, the second information is used to control access of the terminal device.

In a possible implementation, the second information is carried in a second message, the second message includes a first field, and the first field carries the second information.

In a possible implementation, the first message is any one of the following: a downlink radio resource control message transfer message, or a terminal device context request message; and the second message is: an initial uplink radio resource control message transfer message.

In a possible implementation, the first information is carried by a message 1 or a message 3.

In a possible implementation, the first distributed unit and the first central unit are separated network elements in a first network device, where the first network device is configured for the terminal device to access a network; the second distributed unit and the second central unit are separated network elements in a second network device, where the second network device is configured for the terminal device to access a network; the third distributed unit and the third central unit are separated network elements in a third network device, where the third network device is configured for the terminal device to access a network; the second distributed unit and the first central unit are separated network elements in a fourth network device, where the fourth network device is configured for the terminal device to access a network; or the third distributed unit and the first central unit are separated network elements in a fifth network device, where the fifth network device is configured for the terminal device to access a network.

Optionally, the foregoing communication apparatus 1400 may further include a storage unit. The storage unit is configured to store data or instructions (which may also be referred to as code or programs). The foregoing units may interact with or be coupled to the storage unit, to implement a corresponding method or function. For example, the processing module 1410 may read the data or instructions in the storage unit, so that the communication apparatus implements the method in the foregoing embodiment.

It should be understood that, division of the units in the apparatus is merely logical function division. During actual implementation, all or some of the units may be integrated into one physical entity or may be physically separated. In addition, all units in the apparatus may be implemented in a form of software invoked by a processing element, or may be implemented in a form of hardware. Alternatively, some units may be implemented in a form of software invoking by the processing element, and some units may be implemented in a form of hardware. For example, each unit may be a separately arranged processing element, or may be integrated into a chip of the apparatus for implementation. In addition, each unit may alternatively be stored in a memory in a form of a program, and a function of the unit is invoked and executed by a processing element of the apparatus. In addition, all or some of these units may be integrated, or may be implemented independently. The processing element described herein may alternatively be a processor, and may be an integrated circuit having a signal processing capability. In an implementation process, the steps of the foregoing methods or the foregoing units may be implemented using an integrated logic circuit of hardware in the processing element, or may be implemented by invoking software by the processing element.

In an example, a unit in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of these integrated circuit forms. For another example, when the units in the apparatus may be implemented in a form of scheduling a program by the processing element, the processing element may be a general-purpose processor such as a central processing unit (CPU) or another processor that can invoke the program. For another example, such units may be integrated together and implemented in a form of a system-on-a-chip (sSOC).

The foregoing unit for receiving (for example, a receiving unit) is an interface circuit of the apparatus, and is configured to receive a signal from another apparatus. For example, when the apparatus is implemented in a chip manner, the receiving unit is an interface circuit used by the chip to receive a signal from another chip or apparatus. The foregoing unit for sending (for example, a sending unit) is an interface circuit of the apparatus, and is configured to send a signal to another apparatus. For example, when the apparatus is implemented in a chip manner, the sending unit is an interface circuit used by the chip to send a signal to another chip or apparatus.

Figure 15:
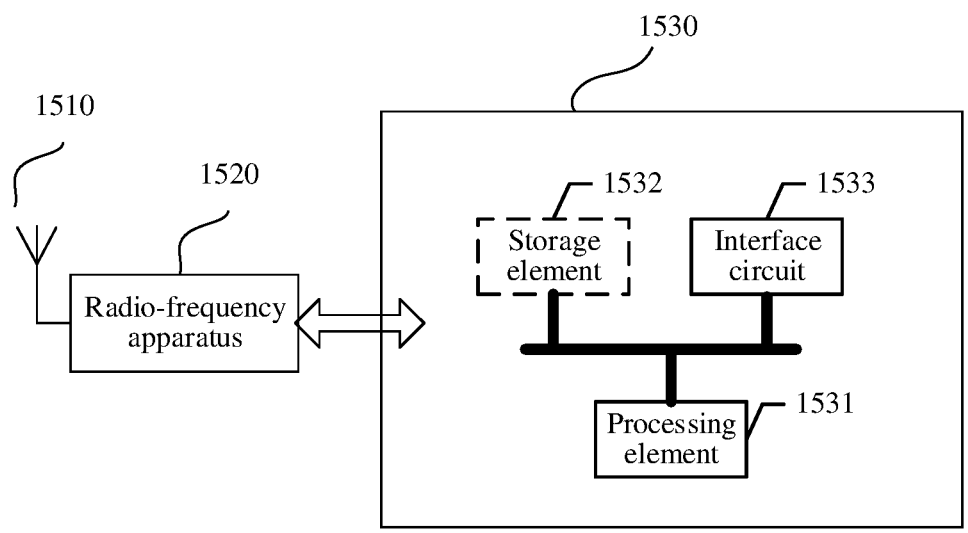
FIG. 15 is a schematic diagram of a communication device according to an embodiment of this application.

FIG. 15 is a schematic diagram of a structure of a communication device according to an embodiment of this application. The communication device is configured to implement operations of the first central unit of the network device or the first distributed unit of the network device in the foregoing embodiments. As shown in FIG. 15, an example in which the communication device is the first central unit or the first distributed unit of the network device is used as an example. The communication device includes: an antenna 1510, a radio-frequency apparatus 1520, and a signal processing pall 1530. The antenna 1510 is connected to the radio-frequency apparatus 1520. In a downlink direction, the radio-frequency apparatus 1520 receives, through the antenna 1510, information sent by the network device or another terminal device, and sends the information sent by the network device or the another terminal device to the signal processing pall 1530 for processing. In an uplink direction, the signal processing part 1530 processes the information from the terminal device, and sends the information to the radio-frequency apparatus 1520. The radio-frequency apparatus 1520 processes the information from the terminal device, and then sends the information to the network device or the another terminal device through the antenna 1510.

An example in which the communication device is the network device is used, and the communication device includes: an antenna 1510, a radio-frequency apparatus 1520, and a signal processing part 1530. The antenna 1510 is connected to the radio-frequency apparatus 1520. In the uplink direction, the radio-frequency apparatus 1520 receives, through the antenna 1510, information sent by a first terminal or another terminal device, and sends the information sent by the first terminal or the another terminal device to the signal processing part 1530 for processing. In the downlink direction, the signal processing part 1530 processes the information from the network device, and sends the information to the radio-frequency apparatus 1520. The radio-frequency apparatus 1520 processes the information from the network device, and then sends the information to the first terminal or the another terminal device through the antenna 1510.

The signal processing part 1530 is configured to process each communication protocol layer of data. The signal processing part 1530 may be a subsystem of the communication device, and the communication device may further include another subsystem, for example, a central processing subsystem configured to implement processing on an operating system and an application layer of the communication device. For another example, a peripheral subsystem is configured to implement a connection to another device. The signal processing part 1530 may be a separately arranged chip. Optionally, the foregoing apparatuses may be located at the signal processing part 1530.

The signal processing part 1530 may include one or more processing elements 1531, for example, include a main control CPU and other integrated circuits, and include an interface circuit 1533. In addition, the signal processing part 1530 may further include a storage element 1532. The storage element 1532 is configured to store data and a program. A program used to perform the method executed by the communication device in the foregoing method may be stored or may not be stored in the storage element 1532, for example, stored in a memory outside the signal processing part 1530. When being used, the signal processing part 1530 loads the program into a cache for use. The interface circuit 1533 is configured to communicate with the apparatus. The foregoing apparatus may be located at the signal processing part 1530. The signal processing pall 1530 may be implemented using a chip. The chip includes at least one processing element and an interface circuit. The processing element is configured to perform steps of any method performed by the foregoing communication device. The interface circuit is configured to communicate with another apparatus. In an implementation, the units for implementing the steps in the foregoing method may be implemented in a form of scheduling a program by a processing element. For example, the apparatus includes a processing element and a storage element, and the processing element invokes a program stored in the storage element, to perform the methods performed by the communication device in the foregoing method embodiments. The storage element may be a storage element located on a same chip as the processing element, that is, an on-chip storage element.

In another implementation, the program used to perform the methods performed by the communication device in the foregoing methods may be a storage element located on a different chip from the processing element, that is, an off-chip storage element. In this case, the processing element invokes the program from the off-chip storage element or loads the program on the on-chip storage element, to invoke and execute the methods performed by the communication device (the first central unit or the first distributed unit of the network device) in the foregoing method embodiments.

In still another implementation, a unit used by the communication device to implement each step in the foregoing methods may be configured as one or more processing elements. These processing elements are arranged on the signal processing part 1530. The processing element herein may be an integrated circuit, for example, one or more ASICs, one or more DSPs, one or more FPGAs, or a combination of these integrated circuits. These integrated circuits may be integrated to form a chip.

Units for implementing the steps in the foregoing methods may be integrated and implemented in a form of a system-on-a-chip (SOC), and the SOC chip is configured to implement the foregoing methods. At least one processing element and a storage element may be integrated in the chip, and the processing element invokes a program stored in the storage element to implement the foregoing methods executed by the communication device. Alternatively, at least one integrated circuit may be integrated in the chip, and is configured to implement the methods performed by the foregoing communication device. Alternatively, with reference to the foregoing implementations, functions of some units may be implemented in a form of invoking the program by the processing element, and the functions of some units are implemented in a form of an integrated circuit.

It can be learned that, the foregoing apparatus may include the at least one processing element and the interface circuit, and the at least one processing element is configured to perform any method performed by the communication device provided in the foregoing method embodiments. The processing element may perform some or all of the steps performed by the communication device in a first manner of invoking the program stored in the storage element. Alternatively, the processing element may perform some or all of the steps performed by the communication device in a second manner of using integrated logical circuit in hardware in the processing element in combination with instructions. Certainly, some or all of the steps performed by the communication device may alternatively be performed with reference to the first manner and the second manner.

The processing element herein is the same as that described above, and may be a general-purpose processor, for example, a CPU, or may be one or more integrated circuits configured to implement the foregoing methods, for example, one or more ASICs, one or more microprocessors DSPs, one or more FPGAs, or a combination of at least two of these integrated circuit forms. The storage element may be a memory or may be a general term of a plurality of storage elements.

It may be understood that, the memory in this embodiment of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through illustrative but not limited descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memories of the systems and methods described in this specification are intended to include, but are not limited to, these and any other suitable types of memories.

An embodiment of this application further provides a computer-readable storage medium storing a computer program. When the computer program is executed by a computer, the method corresponding to any one of the foregoing method embodiments applied to the first central unit or the first distributed unit of the network device is implemented.

An embodiment of this application further provides a computer program product. When the computer program product is executed by a computer, the method described in any method embodiment applied to the first central unit or the first distributed unit of the network device is implemented.

It should be noted that, the terms such as "first" and "second", for example, "first indication information and second indication information", are merely used for distinguishing descriptions and are neither intended to indicate or imply relative importance nor intended to indicate or imply a sequence. "At least one" means one or more, and "a plurality of" means two or more. The term "and/or" is an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one of the following items (pieces)" or similar expressions refer to any combination of these items, including any combination of singular items (pieces) or plural items (pieces). For example, at least one of a, b, or c may represent: a, b, c, a and b, a and c, b and c, or a, b and c, where a, b, and c may be singular or plural.

All or some of the foregoing embodiments may be implemented by software, hardware, firmware, or any combination thereof. When software is used to implement the embodiments, all or a part of the embodiments may be implemented in a form of a computer program product. The computer program product includes one or more computer programs. When the computer program is loaded and executed on the computer, all or some of the procedures or functions according to embodiments of this application are generated. The computer may be a general-purpose computer, a dedicated computer, a computer network, or another programmable apparatus. The computer program may be stored in a computer-readable storage medium or may be transmitted from a computer-readable storage medium to another computer-readable storage medium. For example, the computer program may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

An embodiment of this application further provides a processing apparatus, including a processor and an interface. The processor is configured to perform the method described in any one of the foregoing method embodiments applied to the first central unit or the first distributed unit of the network device.

It should be understood that, the processing apparatus may be a chip, and the processor may be implemented by hardware or may be implemented by software. When being implemented by the hardware, the processor may be a logic circuit, an integrated circuit, or the like. When being implemented by the software, the processor may be a general-purpose processor, and is implemented by reading software code stored in a memory. The memory may be integrated in the processor, or may be located outside the processor and exist independently.

The foregoing descriptions are merely specific implementations of this application, and are not intended to limit the protection scope of embodiments of this application. Any variation or replacement that a person skilled in the art can easily figure out within the technical scope disclosed in embodiments of this application shall fall within the protection scope of embodiments of this application. Therefore, the protection scope of embodiments of this application should be subject to the protection scope of the claims.

What is claimed is:

1. A communication method, comprising:
   receiving, by a distributed unit of a network device, a message 1 or a message 3 from a terminal device that indicates a type of the terminal device, wherein the message 1 indicates the type of the terminal device using a time-frequency resource or a preamble codeword sequence of the message 1, or the message 3 indicates the type of the terminal device according to a logical channel identifier (LCID) field in a media access control (MAC) subheader of the message 3; and
   sending, by the distributed unit to a central unit of the network device, an initial uplink radio resource control message transfer message that comprises a field with second information indicating the type of the terminal device.

2. The method according to claim 1, wherein the type of the terminal device comprises a reduced capability terminal device or a type of reduced capability terminal device.

3. The method according to claim 1, further comprising controlling, by the central unit, access of the terminal device based on the second information.

4. The method according to claim 1, wherein the method further comprises sending, by the central unit, the second information to a third distributed unit, wherein the third distributed unit is a distributed unit to which the terminal device is handed over from the distributed unit.

5. The method according to claim 1, wherein the method further comprises sending, by the central unit, the second information to a third central unit, wherein the third central unit is a central unit to which the terminal device is handed over from the central unit.

6. The method according to claim 4, wherein the second information is used to control access of the terminal device.

7. The method according to claim 1, wherein the distributed unit and the central unit are separated network elements in a first network device, wherein the first network device is configured for the terminal device to access a network;
   wherein a second distributed unit and a second central unit are separated network elements in a second network device, wherein the second network device is configured for the terminal device to access a network;
   wherein a third distributed unit and a third central unit are separated network elements in a third network device, wherein the third network device is configured for the terminal device to access a network;
   wherein the second distributed unit and the central unit are separated network elements in a fourth network device, wherein the fourth network device is configured for the terminal device to access a network; or wherein the third distributed unit and the central unit are separated network elements in a fifth network device, wherein the fifth network device is configured for the terminal device to access a network.

8. A communication apparatus, comprising:
a communication interface;
at least one processor; and
a memory storing a program or instructions that, when executed by the at least one processor, enable the communication apparatus to perform operations comprising:
receiving a message 1 or a message 3 from a terminal device that indicates a type of the terminal device, wherein the message 1 indicates the type of the terminal device using a time-frequency resource or a preamble codeword sequence corresponding to the message 1, or the message 3 indicates the type of the terminal device according to a logical channel identifier (LCID) field in a media access control (MAC) subheader of the message 3; and
sending, to a central unit of a network device, an initial uplink radio resource control message transfer message that comprises a field with second information indicating the type of the terminal device.

9. The communication apparatus according to claim 8, wherein the communication apparatus is a distributed unit of a network device.

10. A non-transitory computer-readable storage medium storing instructions that, when the instructions are run on a computer, enable the computer to perform the method according to claim 1.

11. A communication method, comprising:
receiving, by a central unit of a network device from a distributed unit of the network device, an initial uplink radio resource control message transfer message that comprises a field with second information indicating a type of a terminal device, wherein the type of the terminal device is indicated by a message 1 or a message 3 sent to the distributed unit from the terminal device, wherein the message 1 indicates the type of the terminal device using a time-frequency resource or a preamble codeword sequence of the message 1, or the message 3 indicates the type of the terminal device according to a logical channel identifier (LCID) field in a media access control (MAC) subheader of the message 3; and
controlling, by the central unit of a network device, access of the terminal device based on the second information indicated by the initial uplink radio resource control message transfer message.

12. The method according to claim 11, wherein the type of the terminal device comprises a reduced capability terminal device or a type of reduced capability terminal device.

13. The method according to claim 11, wherein the method further comprises sending, by the central unit, the second information to a third distributed unit, wherein the third distributed unit is a distributed unit to which the terminal device is handed over from the distributed unit.

14. The method according to claim 11, wherein the method further comprises sending, by the central unit, the second information to a third central unit, wherein the third central unit is a central unit to which the terminal device is handed over from the central unit.

* * * * *